(12) United States Patent
Yamaguchi et al.

(10) Patent No.: US 8,844,350 B2
(45) Date of Patent: Sep. 30, 2014

(54) FLOW QUANTITY MEASURING APPARATUS INCLUDING BRANCHED CONDUCTIVE LINES CONNECTED TO MIDPOINTS OF SERIES CIRCUITS OF THE BRIDGE CIRCUIT

(75) Inventors: Junzo Yamaguchi, Nagoya (JP); Yasushi Kohno, Obu (JP)

(73) Assignee: Denso Corporation, Kariya (JP)

( * ) Notice: Subject to any disclaimer, the term of this patent is extended or adjusted under 35 U.S.C. 154(b) by 465 days.

(21) Appl. No.: 13/242,130

(22) Filed: Sep. 23, 2011

(65) Prior Publication Data
US 2012/0085163 A1    Apr. 12, 2012

(30) Foreign Application Priority Data
Oct. 6, 2010   (JP) ................................ 2010-226663

(51) Int. Cl.
*G01F 1/68* (2006.01)
*G01F 1/00* (2006.01)

(52) U.S. Cl.
CPC ....................................... *G01F 1/00* (2013.01)
USPC ...................................................... 73/204.26

(58) Field of Classification Search
None
See application file for complete search history.

(56) References Cited

U.S. PATENT DOCUMENTS

| | | | |
|---|---|---|---|
| 6,889,545 B2 | 5/2005 | Nakada et al. | |
| 7,337,661 B2 | 3/2008 | Yamada et al. | |
| 7,395,707 B2 * | 7/2008 | Watanabe et al. | 73/204.26 |
| 7,409,859 B2 * | 8/2008 | Watanabe et al. | 73/204.26 |
| 8,069,718 B2 * | 12/2011 | Nakano et al. | 73/204.26 |
| 2003/0182999 A1 | 10/2003 | Kouno | |
| 2006/0162442 A1 | 7/2006 | Matsumoto et al. | |
| 2007/0056366 A1 * | 3/2007 | Sakuma et al. | 73/204.26 |
| 2007/0089504 A1 | 4/2007 | Hanzawa et al. | |
| 2007/0251315 A1 * | 11/2007 | Sukegawa et al. | 73/204.27 |
| 2008/0016958 A1 * | 1/2008 | Matsumoto et al. | 73/204.26 |
| 2010/0170335 A1 * | 7/2010 | Nakano et al. | 73/204.26 |

FOREIGN PATENT DOCUMENTS

| | | |
|---|---|---|
| JP | P2002-277483 A | 9/2002 |
| JP | 3675721 | 5/2005 |
| JP | 2006-258675 | 9/2006 |
| JP | 2009-264741 | 11/2009 |
| JP | 2009-270930 | 11/2009 |

OTHER PUBLICATIONS

Japanese Office Action dated Aug. 21, 2012, issued in corresponding Japanese Application No. 2010-226663 with English translation.

* cited by examiner

*Primary Examiner* — Harshad R Patel
(74) *Attorney, Agent, or Firm* — Nixon & Vanderhye, P.C.

(57) ABSTRACT

A sensor chip in a flow quantity measuring apparatus includes a first conductive line, through which a midpoint electric potential of a first series circuit of a bridge circuit is outputted, is branched from a first midpoint connection on a sensor chip. A second conductive line, through which a midpoint electric potential of a second series circuit of the bridge circuit is outputted, is branched from a second midpoint connection on the sensor chip. The output point of the midpoint electric potential of the first series circuit is provided at a midpoint between two temperature sensor resistors, and the first midpoint connection is provided on a center line of a heater resistor. The output point of the midpoint electric potential of the second series circuit is provided at a midpoint between two temperature sensor resistors, and the second midpoint connection is provided on the center line of the heater resistor.

13 Claims, 9 Drawing Sheets

FLOW QUANTITY MEASURING APPARATUS INCLUDING BRANCHED CONDUCTIVE LINES CONNECTED TO MIDPOINTS OF SERIES CIRCUITS OF THE BRIDGE CIRCUIT

CROSS REFERENCE TO RELATED APPLICATION

This application is based on and incorporates herein by reference Japanese Patent Application No. 2010-226663 filed on Oct. 6, 2010.

BACKGROUND OF THE INVENTION

1. Field of the Invention

The present invention relates to a flow quantity measuring apparatus.

2. Description of Related Art

For instance, Japanese Patent JP3675721B2 and Japanese Unexamined Patent Publication JP2006-258675A teach a flow quantity measuring apparatus, which includes a thermal air flow meter. The thermal air flow meter includes a heat generating resistor and temperature sensitive resistors, a resistance value of which changes depending on the temperature, to sense the flow quantity of the air.

Specifically, the thermal air flow meter includes a sensor chip, a heater resistor (heat generating resistor), two upstream-side temperature sensor resistors (upstream-side temperature sensitive resistors), two downstream-side temperature sensor resistors (downstream-side temperature sensitive resistors) and an intake air temperature sensor resistor. The sensor chip includes a silicon circuit board, on which a membrane (thin wall portion) and a group of electrode pads are formed. The heater resistor generates heat upon receiving a heating electric current. The upstream-side temperature sensor resistors are placed on an upstream side of the heater resistor in the flow direction of the air. The downstream-side temperature sensor resistors are placed on a downstream side of the heater resistor. The intake air temperature sensor resistor senses the ambient temperature (temperature of the intake air) around the intake air temperature sensor resistor.

The heater resistor is placed on the membrane of the sensor chip. Each of the upstream-side temperature sensor resistors and the downstream-side temperature sensor resistors is placed at a corresponding location on the membrane of the sensor chip where each of the upstream-side temperature sensor resistors and the downstream-side temperature sensor resistors is influenced by the heat generated from the heater resistor. The intake air temperature sensor is placed on a corresponding location on the sensor chip where the intake air temperature sensor is not influenced by the heat generated from the heater resistor.

The membrane of the sensor chip has a film thickness, which is smaller than that of the other portion of the sensor chip, so that a heat capacity of the membrane is small, and thereby it is possible to obtain a quick thermal response in response to a change in the flow quantity of the air.

A flow quantity sensing circuit (operational amplifier), which senses the air flow quantity, includes a bridge circuit that has a first series circuit and a second series circuit connected with each other in parallel. In the first series circuit, the corresponding upstream-side temperature sensor resistor and the corresponding downstream-side temperature sensor resistor (first resistor) are connected with each other in series. In the second series circuit, the corresponding downstream-side temperature sensor resistor and the corresponding upstream-side temperature sensor resistor (second resistor) are connected with each other in series. A resistance value of each temperature sensor resistor changes depending on the temperature, so that it is possible to obtain a voltage signal, which corresponds to the air flow quantity, through sensing of a change in the resistance value. Specifically, the flow quantity sensing circuit is constructed such that a midpoint electric potential difference of the bridge circuit is converted into a corresponding voltage that is, in turn, outputted as an air flow quantity voltage signal from the flow quantity sensing circuit to an engine control unit (ECU).

A first connection, which is between the corresponding upstream-side temperature sensor resistor and the corresponding downstream-side temperature sensor resistor, and a second connection, which is between the corresponding upstream-side temperature sensor resistor and the corresponding downstream-side temperature sensor resistor, are placed at a location outside of the sensor chip (e.g., placed in conductive lines on a circuit chip). That is, conductive lines, through which the midpoint electric potential difference is outputted from the bridge circuit, are branched from the first connection and the second connection, respectively, of the circuit chip.

Furthermore, the drive circuit (an operational amplifier and a transistor) of the heater resistor includes a bridge circuit, which has a third series circuit and a fourth series circuit. In the third series circuit, the heater resistor and a third resistor are connected with each other in series. In the fourth series circuit, the intake air temperature sensor resistor and a fourth resistor are connected with each other in series. The heating electric current, which flows through the heater resistor, is variably controlled by the drive circuit of the heater resistor such that the midpoint electric potential difference of the bridge circuit becomes 0 (zero).

Furthermore, a third connection, which is between the heater resistor and the third resistor, and a fourth connection, which is between the intake air temperature sensor resistor and the fourth resistor, are placed at a location outside of the sensor chip (e.g., placed in conductive lines on the circuit chip). That is, conductive lines, through which the midpoint electric potential difference is outputted from the bridge circuit, are branched from the third connection and the fourth connection, respectively, of the circuit chip.

Japanese Unexamined Patent Publication JP2009-264741A and Japanese Unexamined Patent Publication JP2009-270930A teach a flow quantity measuring apparatus, in which electrode pads on a sensor chip and electrode pads on a circuit chip are connected through bonding wires, and portions of resistor conductive lines of each temperature sensor resistor, the electrode pads on the sensor chip, the electrode pads on the circuit chip and the bonding wires are covered with molded epoxy resin (encapsulating resin). Furthermore, portions of resistor conductive lines of the heater resistor and the intake air temperature sensor resistor, the electrode pads on the sensor chip the electrode pads on the circuit chip, the bonding wires and the conductive lines on the circuit chip are also covered with the molded epoxy resin (encapsulating resin).

However, in the flow quantity measuring apparatus of Japanese Patent JP3675721B2 and Japanese Unexamined Patent Publication JP2006-258675A, each resistor conductive line (the electrode pad on the sensor chip, the electrode pad on the circuit chip, the bonding wire and the connecting conductive line on the circuit chip), which extends from the corresponding temperature sensor resistor to the corresponding conductive line for outputting the midpoint electric potential difference of the bridge circuit, is very long. Therefore, an unnecessary conductive line resistance is applied on the bridge circuit, so that the detection sensitivity for detecting, i.e., sensing the air flow quantity is disadvantageously deteriorated.

Similarly, each resistor conductive line (the electrode pad on the sensor chip, the electrode pad on the circuit chip, the bonding wire and the connecting conductive line on the circuit chip), which extends from a corresponding one of the heater resistor and the intake air temperature sensor resistor to the corresponding conductive line for outputting the midpoint electric potential difference of the bridge circuit, is very long. Therefore, an unnecessary conductive line resistance is applied on the bridge circuit, so that the control sensitivity (accuracy) for controlling the heating temperature (heater temperature) of the heater resistor is disadvantageously deteriorated.

Furthermore, in the flow quantity measuring apparatus of Japanese Unexamined Patent Publication JP2009-264741A and Japanese Unexamined Patent Publication JP2009-270930A, surfaces of the resistor conductive lines, which are located adjacent to the electrode pads on the sensor chip, and the connecting conductive lines, which are located on the circuit chip, are covered with the molded resin, which has a different coefficient of linear expansion that is different from that of the resistor conducive lines and the connecting conductive lines. Therefore, when a stress is applied to the resistance conductive lines, which are located on the sensor chip, and the connecting conductive lines, which are located on the circuit chip, the conductive line resistance value and/or the temperature coefficient of resistance will be disadvantageously changed, i.e., fluctuated.

Here, it is conceivable to increase the temperature of the heater resistor from the temperature of the heater resistor of the current product to improve the detection sensitivity for detecting, i.e., sensing the air flow quantity. However, when the temperature of the heater resistor is increased, the heating electric current, which flows through the heater resistor, is also increased, thereby disadvantageously resulting in an increase in the electric consumption. Also, when the temperature of the heater resistor is increased, the thermal degradation of the heater resistor is promoted. Therefore, the durability (lifetime) of the heater resistor is disadvantageously deteriorated.

Japanese Unexamined Patent Publication JP2003-315130A (corresponding to U.S.2003/0182999A1) teaches a flow quantity measuring apparatus, in which all of resistors (a heater resistor, fixed resistors and an intake air temperature sensor resistor) are formed such that an insulation film (lower film) is formed on a common silicon circuit board (silicon chip), and a resistor film (thin film) of, for example, platinum is formed in a predetermined pattern on the insulation film through a vacuum vapor deposition process. In this way, a film thickness of the resistor film is stabilized, and thereby variations in the resistance values of all of the resistors of the bridge circuit are limited.

Furthermore, Japanese Unexamined Patent Publication JP2003-315130A (corresponding to U.S.2003/0182999A1) also teaches that the bridge circuit, which is used in the flow quantity sensing circuit, includes first and second upstream-side temperature sensor resistors and first and second resistors. Furthermore, a first connection, a first lead conductive line, a second connection and a second lead conductive line are formed on the insulation film of the silicon chip. The first upstream-side temperature sensor resistor and the first resistor are connected with each other at the first connection. The midpoint electric potential is outputted from the first connection to a first electrode pad through the first lead conductive line. The second upstream-side temperature sensor resistor and the second resistor are connected with each other at the second connection. The midpoint electric potential is outputted from the second connection to a second electrode pad through the second lead conductive line.

In the flow quantity measuring apparatus of Japanese Unexamined Patent Publication JP2003-315130A (corresponding to U.S.2003/0182999A1), output points, through which the midpoint electric potentials are outputted, are not provided in a midpoint of a first connecting conductive line, which connects between the first upstream-side temperature sensor resistor and the first resistor, and a midpoint of a second connecting conductive line, which connects between the second-upstream side temperature sensor resistor and the second resistor. That is, the first and second connections are not formed in the midpoints, respectively, of the first and second connecting conductive lines.

Therefore, like in the cases of JP3675721B2, JP2006-258675A, JP2009-264741A, JP2009-270930A and JP2003-315130A (corresponding to U.S.2003/0182999A1) where the bridge circuit, which is used in the flow quantity sensing circuit, is formed with two pairs of temperature sensor resistors (temperature sensor resistors connected in series) that need to have pair characteristics (identical characteristics) with respect to the temperature characteristics of the resistance value, the required pair characteristics with respect to the temperature characteristics of the resistance value cannot be maintained in the temperature sensor resistors of each pair. Thereby, in such a case, the detection sensitivity for detecting, i.e., sensing the air flow quantity may possibly be deteriorated.

SUMMARY OF THE INVENTION

The present invention addresses the above disadvantages. According to the present invention, there is provided a flow quantity measuring apparatus, which includes a sensor chip, a heat generating resistor, first and second upstream-side temperature sensitive resistors and first and second downstream-side temperature sensitive resistors. The sensor chip has a circuit board, which includes a thin wall portion. A wall thickness of the thin wall portion, which is measured in a direction perpendicular to a plane of the circuit board, is smaller than that of an adjacent area of the circuit board that is adjacent to the thin wall portion. The heat generating resistor is placed on the thin wall portion. The heat generating resistor generates heat when a heating electric current flows through the heat generating resistor. The first and second upstream-side temperature sensitive resistors are placed on the thin wall portion and are located on an upstream side of the heat generating resistor in a flow direction of fluid. A resistance value of each of the first and second upstream-side temperature sensitive resistors is variable depending on a temperature. The first and second downstream-side temperature sensitive resistors are placed on the thin wall portion and are located on a downstream side of the heat generating resistor in the flow direction of the fluid. A resistance value of each of the first and second downstream-side temperature sensitive resistors is variable depending on a temperature. The first upstream-side temperature sensitive resistor and the first downstream-side temperature sensitive resistor are connected with each other in series to form a first series circuit. The second downstream-side temperature sensitive resistor and the second upstream-side temperature sensitive resistor are connected with each other in series to form a second series circuit. The first series circuit and the second series circuit are connected with each other in parallel to form a bridge circuit.

The first upstream-side temperature sensitive resistor and the first downstream-side temperature sensitive resistor have a generally identical characteristic with respect to a change in the resistance value thereof relative to the temperature. The second downstream-side temperature sensitive resistor and the second upstream-side temperature sensitive resistor have a generally identical characteristic with respect to a change in the resistance value thereof relative to the temperature. The bridge circuit includes a first conductive line, through which a midpoint electric potential of the first series circuit is outputted, and a second conductive line, through which a midpoint electric potential of the second series circuit is outputted. The first series circuit includes a first connection, which is located at a midpoint between the first upstream-side temperature sensitive resistor and the first downstream-side temperature sensitive resistor and is connected with the first conductive line. The second series circuit includes a second connection, which is located at a midpoint between the second downstream-side temperature sensitive resistor and the second upstream-side temperature sensitive resistor and is connected with the second conductive line. One of the first connection and the second connection is placed on the sensor chip. One of the first conductive line and the second conductive line, which corresponds to the one of the first connection and the second connection, is branched from a corresponding one of the first series circuit and the second series circuit on the sensor chip.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1:
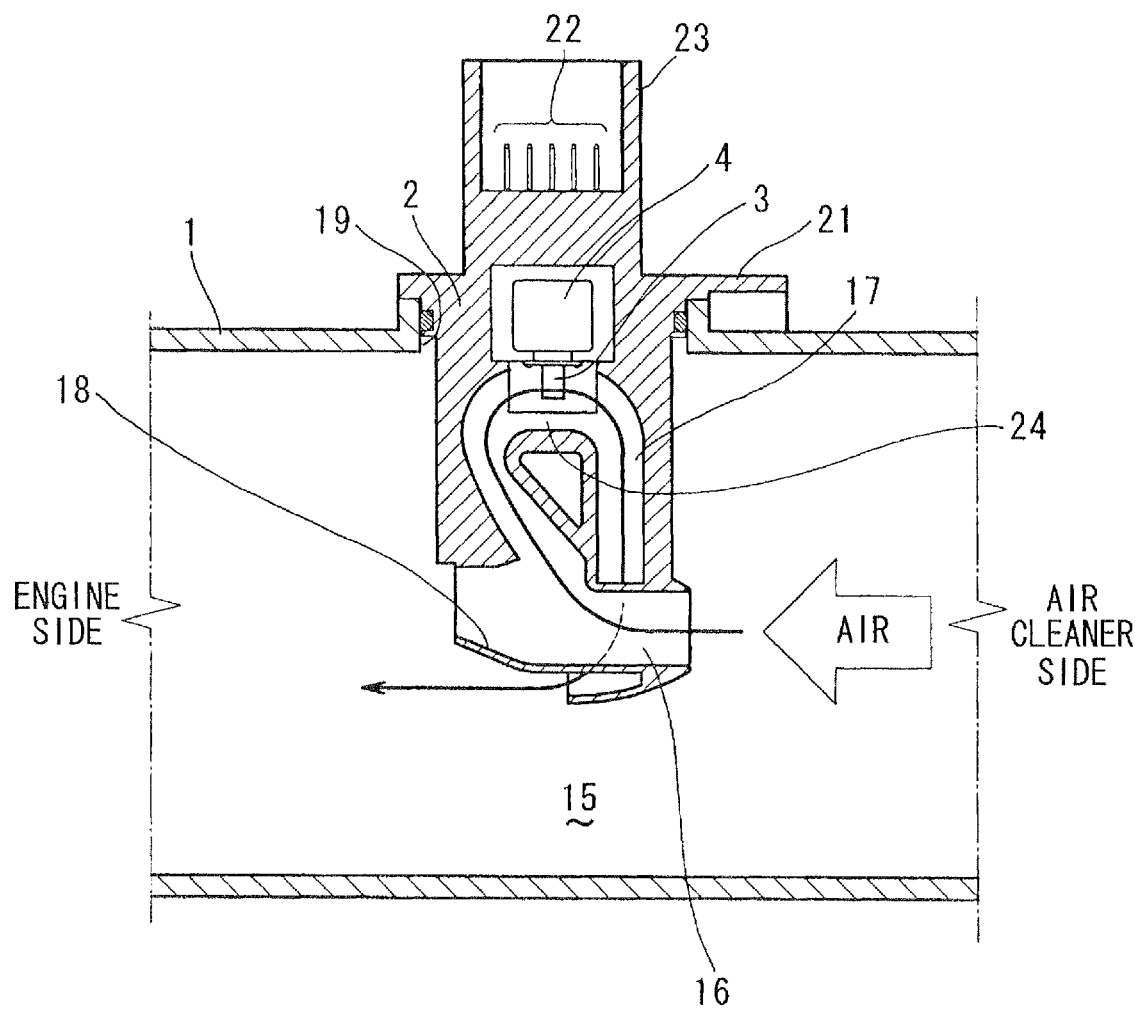
FIG. 1 is a cross-sectional view showing an air flow quantity measuring apparatus installed to an intake pipe according to a first embodiment of the present invention.
Figure 2:
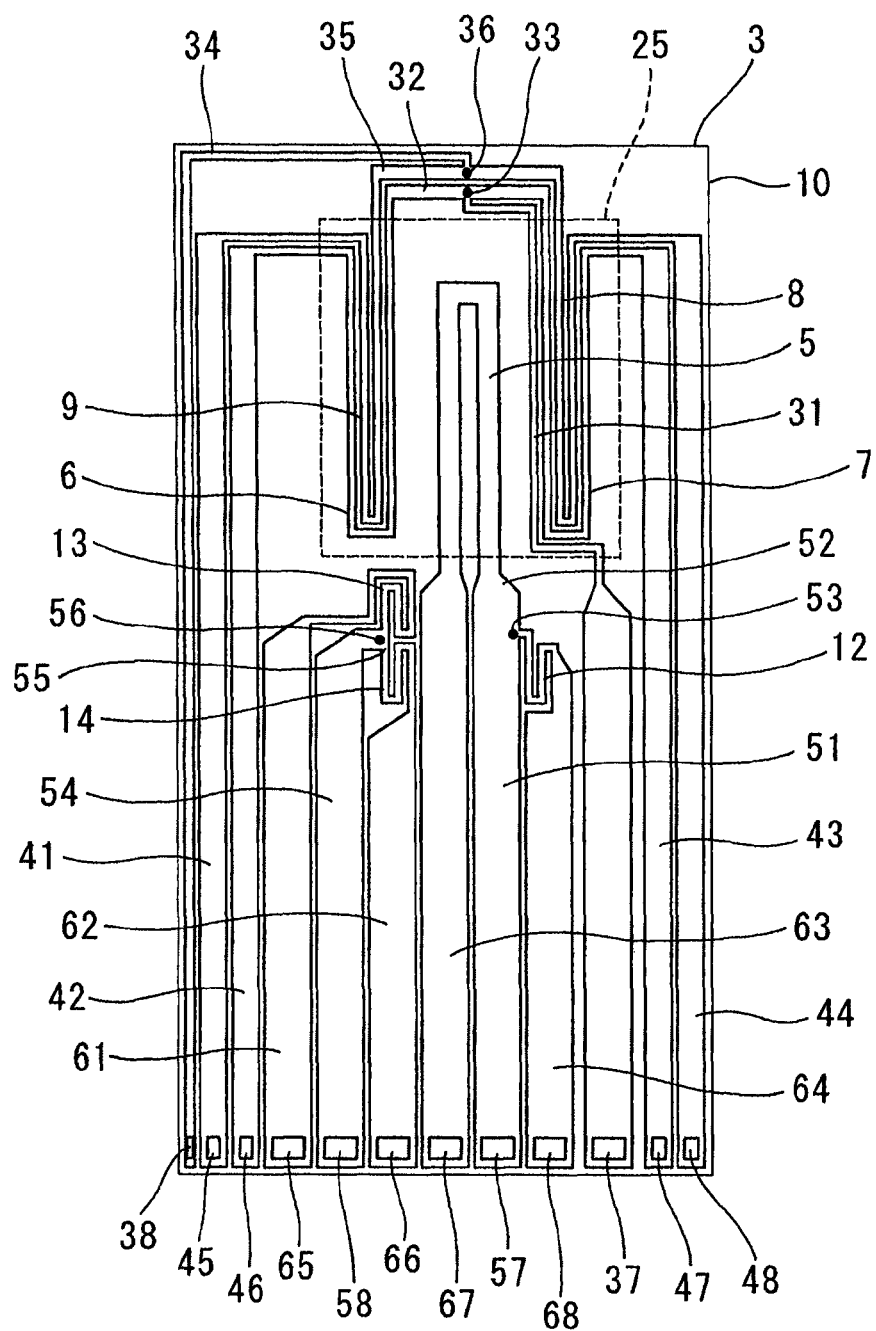
FIG. 2 is a plan view of a sensor chip of the air flow quantity measuring apparatus of the first embodiment.
Figure 3:
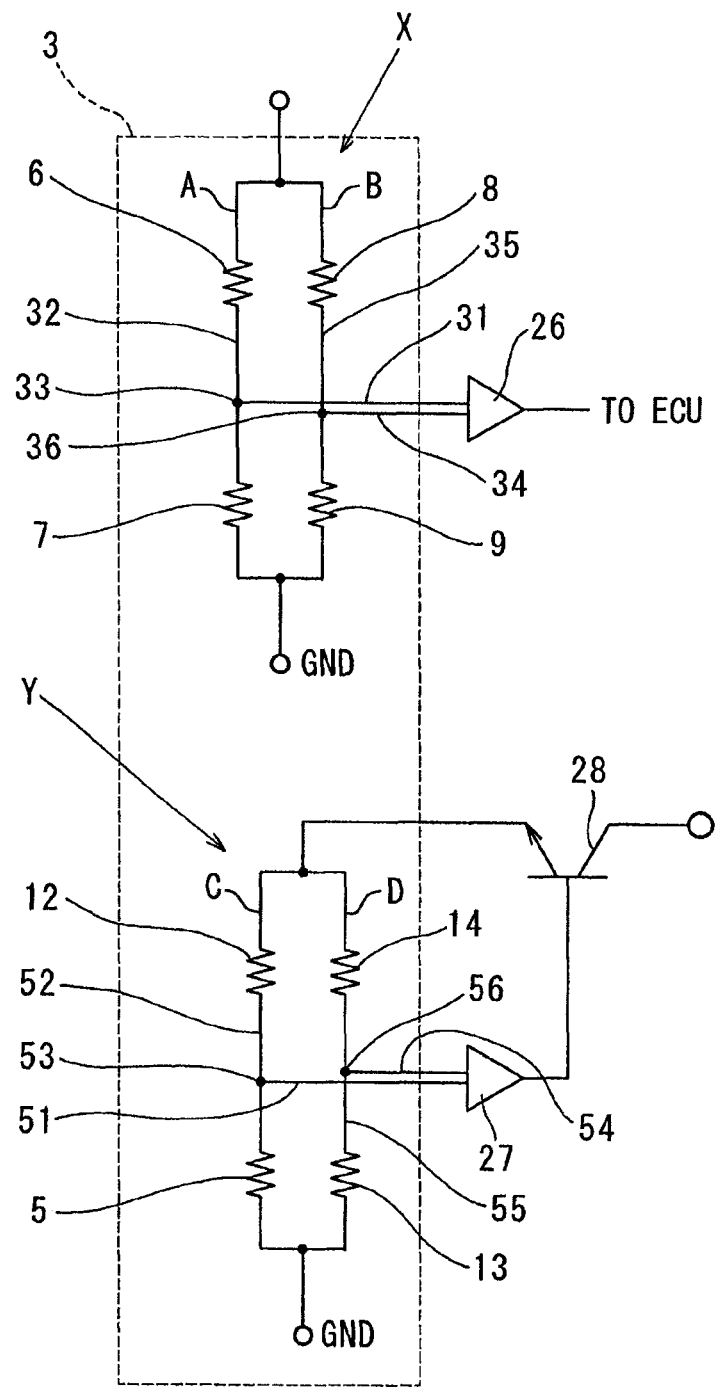
FIG. 3 is a circuit diagram showing a circuit structure of the air flow quantity measuring apparatus of the first embodiment.

FIGS. 1 to 3 show a first embodiment of the present invention. Specifically, FIG. 1 is a diagram showing an air flow quantity measuring apparatus installed to an intake pile. FIG. 2 is a diagram showing a sensor chip of the air flow quantity measuring apparatus. FIG. 3 is a diagram showing a circuit structure of the air flow quantity measuring apparatus.

A control system (engine control system) of an internal combustion engine of the present embodiment includes the air flow quantity measuring apparatus, which measures (computes) the quantity (the air flow quantity) of the intake air (fluid) supplied to a combustion chamber of the engine.

The air flow quantity measuring apparatus includes an engine control unit (ECU), which is also referred to as an engine control device, and a thermal air flow meter (AFM). The ECU executes various engine control operations. The air flow meter outputs an air flow quantity voltage signal (analog signal) to a microcomputer of the ECU.

In the present embodiment, the engine is a multi-cylinder gasoline engine having a plurality of cylinders. The engine generates its output from a heat energy that is obtained through combustion of an air-fuel mixture gas, which includes external air (intake air) filtered through an air cleaner and fuel, in a combustion chamber of the cylinder.

An intake pipe 1 is connected to intake ports of the cylinders of the engine. An intake passage is formed in an inside of the intake pipe 1 to supply the intake air to the combustion chamber of each cylinder of the engine. Furthermore, an exhaust pipe is connected to exhaust ports of the cylinders of the engine E. An exhaust passage is formed in an inside of the exhaust pipe to externally output the exhaust gas, which is discharged from the combustion chambers of the cylinders of the engine, through an exhaust gas purifying apparatus.

An air filter of the air cleaner, the air flow meter of the air flow quantity measuring apparatus, an electronic throttle apparatus (a throttle body, a throttle valve and a throttle opening degree sensor), a surge tank and an intake manifold are placed in the intake pipe 1. An exhaust manifold and an exhaust gas sensor (an air-fuel ratio sensor, an oxygen concentration sensor) are placed in the exhaust pipe.

The ECU has the microcomputer of a known type, which includes, for example, a CPU and memory devices (e.g., a ROM and a RAM). The CUP executes control operations and computing operations. The storage devices store control programs and/or control logics as well as various types of data. At the ECU, the air flow quantity voltage signal, which is outputted from the air flow meter, is supplied to the microcomputer. Furthermore, the sensor signals of various sensors are supplied to the microcomputer of the ECU after analog-to-digital conversion of the sensor singles through an analog-to-digital converter circuit.

The microcomputer of the ECU senses the air flow quantity and the air flow direction of the intake air based on the air flow quantity voltage signal, which is outputted from the air flow meter. Then, the microcomputer computes an injection quantity of fuel, which is injected from the injector into the intake port or the combustion chamber of the corresponding cylinder of the engine, based on the sensed air flow quantity. Thereafter, the ECU variably controls an energization time period (valve open time period) of the injector based on the computed fuel injection quantity. Also, the ECU controls the energization time period of the injector in association with the various systems/apparatuses, such as the electronic throttle apparatus, the fuel supply apparatus (fuel pump, a fuel injection device) and the ignition apparatus.

The air flow meter is of a plug-in type and is thereby detachably installed to the intake pipe 1. The air flow meter includes a hollow housing 2, a sensor chip 3 and a control circuit chip 4. The housing 2 is a sensor body made of a synthetic resin material. The sensor chip 3 is configured into a rectangular body and is placed in an inside of the housing 2. The control circuit chip 4 is configured into a rectangular body. The air flow meter is the thermal air flow meter, which measures the air flow quantity based on a quantity of heat release that is released from a heater resistor (heat generating resistor) 5, particularly, in a form of a hot wire.

A flow quantity sensing unit, which includes the heater resistor 5, four temperature sensor resistors 6-9, a fixed resistor (serving as a third resistor) 12, a temperature sensor resistor 13 and a fixed resistor (serving as a fourth resistor) 14, is formed on the sensor chip 3. A group of electrode pads (a plurality of electrode pads), to which bonding wires are electrically connected, is formed at a longitudinal end portion of the sensor chip 3 (a portion of the sensor chip 3, which is a lower end portion in FIG. 2 and is other than the flow quantity sensing unit).

Two bypass flow passages 16, 17 are formed in the inside of the housing 2 to conduct a portion of the intake air that flows in the intake passage (e.g., a main flow passage 15) of the intake pipe 1. The housing 2 is inserted from an outside of the intake pipe 1 into the inside of the intake pipe 1 through an installation hole 19, which is formed at a predetermined location of the intake pipe 1, so that the housing 2 projects into the main flow passage 15 of the intake pipe 1. Furthermore, a flange 21 is integrally formed in the housing 2. The flange 21 is securely fastened to a peripheral edge portion (outer wall surface) of the installation hole 19 of the intake pipe 1 through fastener screws (not shown). A connector housing 23, which holds a plurality of terminals 22, is integrally formed in an upper portion of the housing 2, which is located at an upper side in the height direction of the housing 2 (top-to-bottom direction in FIG. 1). The terminals 22 of the connector housing 23 electrically connect control circuits (a flow quantity sensing circuit of the air flow meter and a temperature control circuit of the heater resistor 5) of the sensor chip 3 and of the control circuit chip 4 to the ECU and a battery (electric power source).

The bypass flow passage 16 is an air flow passage (linear flow passage), which is generally parallel to the flow direction of the air in the main flow passage 15 of the intake pipe 1 and bypasses the main flow passage 15 of the intake pipe 1. An inlet is formed in an upstream end of the bypass flow passage 16 to receive the intake air from the main flow passage 15 of the intake pipe 1. An outlet is formed in a downstream end of the bypass flow passage 16 to output the intake air to the main flow passage 15 of the intake pipe 1. A choked section 18 is formed in the bypass flow passage 16 at an outlet side of the bypass flow passage 16 and is tapered such that a flow passage cross-sectional area of the choked section 18 progressively decreases toward the downstream side in the flow direction of the air.

The bypass flow passage 17 is an air flow passage (circling flow passage), which receives a portion of the air flow from the bypass flow passage 16 and bypasses the main flow passage 15 of the intake pipe 1. The bypass flow passage 17 includes an inlet and an outlet. The inlet of the bypass flow passage 17 is branched from the bypass flow passage 16 at a location, which is located on an upstream side of the choked section 18 in the bypass flow passage 16 in the flow direction of the intake air. The outlet of the bypass flow passage 17 is formed at two opposed sides of the bypass flow passage 16. A U-turn passage section is formed between the inlet and the outlet in the bypass flow passage 17 such that a flow direction of the intake air is changed by 180 degrees (making U-turn) in the U-turn passage section. A linear passage part (horizontal passage part) 24 is formed in a center part of the U-turn passage section, and the sensor chip 3 is placed in the linear passage part 24. The bypass flow passage 17 is branched on the upstream side of the outlet of the linear passage part 24.

The sensor chip 3 includes a planar circuit board 10 made of silicon. A dielectric support film, which is made of silicon nitride, is formed on a surface of the circuit board 10. The flow quantity sensing unit (the heater resistor 5, the temperature sensor resistors 6-9, the temperature sensor resistor 13 and the fixed resistors 12, 14) and the electrode pads, which are electrically connected to the electrode pads of the control circuit chip 4 through boding wires, are formed on the support film of the circuit board 10. A dielectric protective film, which is made of silicon nitride, is formed on the flow quantity sensing unit to protect the flow quantity sensing unit.

The air flow meter includes sealing resin (mold resin), which is placed to expose the flow quantity sensing unit of the sensor chip 3 from the sealing resin. The mold resin coves the electrode pads of the sensor chip 3, the electrode pads and the circuit of the control circuit chip 4 and the bonding wires. A membrane (thin wall portion) 25 is formed in the sensor chip 3 by etching a rear surface of the circuit board 10 to have a wall thickness, which is measured in a direction perpendicular to a plane of the circuit board 10 and is small than that of a surround adjacent area of the circuit board 10, which surrounds the membrane 25.

The control circuit chip 4 includes a planar circuit board, which is made of silicon. Differential amplifiers (operational amplifiers) 26, 27, a transistor 28 and a diode are installed to the circuit board. The electrode pads are formed at the sensor chip 3 side end portion of the circuit board of the control circuit chip 4 and are electrically connected to the electrode pads of the sensor chip 3 through the bonding wires.

The heater resistor 5 is the heat generating resistor, which is configured into a thin film form and is heated to a high temperature upon flowing of the electric current therethrough. The heater resistor 5 is formed by forming a thin film of platinum (Pt), polycrystalline silicon (Poly-Si) or single crystal silicon on the membrane 25 of the sensor chip 3 through a vacuum vapor deposition process or a spattering process.

The temperature sensor resistors 6-9, 13 are formed as a temperature sensitive resistor, a value of resistance (hereinafter referred to as a resistance value) of which changes, i.e., is variable depending on the temperature around the resistor. Similar to the heater resistor 5, each of the temperature sensor resistors 6-9, 13 is formed as a thin film of platinum (Pt), polycrystalline silicon (Poly-Si) or single crystal silicon on the membrane 25 of the sensor chip 3 through the vacuum vapor deposition process or the spattering process.

The fixed resistors 12, 14 are formed as a fixed resistor, a resistance value of which is fixed. Similar to the heater resistor 5, each of the fixed resistors 12, 14 is formed as a thin film of platinum (Pt), polycrystalline silicon (Poly-Si) or single crystal silicon on the membrane 25 of the sensor chip 3 through the vacuum vapor deposition process or the spattering process.

As shown in FIGS. 2 and 3, the flow quantity sensing circuit of the air flow meter includes a bridge circuit (also referred to as a first bridge circuit) X, which is formed as the thin film on the sensor chip 3, and the differential amplifier 26, which is placed on the control circuit chip 4.

The bridge circuit X includes two series circuits, i.e., a first series circuit A and a second series circuit B, which are connected with each other in parallel. The first series circuit A is a circuit, in which the temperature sensor resistor 6 and the temperature sensor resistor 7 are connected with each other in series. The second series circuit B is a circuit, in which the temperature sensor resistor 8 and the temperature sensor resistor 9 are connected with each other in series.

In the flow quantity sensing circuit of the air flow meter, the differential amplifier 26 is used to obtain a bridge output voltage (an electric potential difference between a midpoint electric potential of the first series circuit A and a midpoint electric potential of the second series circuit B, i.e., VA−VB) and to amplify this bridge output voltage, so that the amplified bridge output voltage is outputted as an air flow quantity voltage signal from the flow quantity sensing circuit to the ECU.

The temperature sensor resistor 6 is a temperature sensing resistor, a resistance value RU1 of which changes depending on the temperature. The temperature sensor resistor 6 is placed on an upstream side of the heater resistor 5 in the flow direction of the air. The temperature sensor resistor 6 serves as a first upstream-side temperature sensitive resistor that senses an upstream-side temperature at an upstream-side location, which is adjacent to the heater resistor 5 and is located on the upstream side of the heater resistor 5 in the flow direction of the air.

The temperature sensor resistor 7 is a temperature sensing resistor, a resistance value RD1 of which changes depending on the temperature. The temperature sensor resistor 7 is placed on a downstream side of the heater resistor 5 in the flow direction of the air. The temperature sensor resistor 7 serves as a first downstream-side temperature sensitive resistor that senses a downstream-side temperature at a downstream-side location, which is adjacent to the heater resistor 5 and is located on the downstream side of the heater resistor 5 in the flow direction of the air.

The temperature sensor resistor 8 is a temperature sensing resistor, a resistance value RD2 of which changes depending on the temperature. The temperature sensor resistor 8 is placed on a downstream side of the temperature sensor resistor 7 in the flow direction of the air. The temperature sensor resistor 8 serves as a second downstream-side temperature sensitive resistor that senses a downstream-side temperature at a downstream-side location, which is adjacent to the heater resistor 5 and is located on the downstream side of the heater resistor 5 in the flow direction of the air.

The temperature sensor resistor 9 is a temperature sensing resistor, a resistance value RU2 of which changes depending on the temperature. The temperature sensor resistor 9 is placed on an upstream side of the temperature sensor resistor 6 in the flow direction of the air. The temperature sensor resistor 9 serves as a second upstream-side temperature sensitive resistor that senses an upstream-side temperature at an upstream-side location, which is adjacent to the heater resistor 5 and is located on the upstream side of the heater resistor 5 in the flow direction of the air.

A supply voltage (power source voltage) is applied to a connecting point between the temperature sensor resistor 6 and the temperature sensor resistor 8. An electric potential of a connecting point between the temperature sensor resistor 7 and the temperature sensor resistor 9 is a ground (GND) electric potential.

Now, a mechanism of sensing the flow quantity and the flow direction of the air will be described. An electric potential of the midpoint connection of the first series circuit A of the bridge circuit X will be indicated by VA, and an electric potential of the midpoint connection of the second series circuit B of the bridge circuit X will be indicated by VB.

In a no-flow state of the air where no air flow exists, a symmetrical temperature distribution is developed about the heater resistor 5. Therefore, in the no-flow state of the air, a quantity of heat, which is applied from the heater resistor 5 to the temperature sensor resistor 6, is generally the same as a quantity of heat, which is applied from the heater resistor 5 to the temperature sensor resistor 7, and a quantity of heat, which is applied from the heater resistor 5 to the temperature sensor resistor 8, is generally the same as a quantity of heat, which is applied from the heater resistor 5 to the temperature sensor resistor 9. Thereby, the resistance value RU1 of the temperature sensor resistor 6 is generally the same as the resistance value RD1 of the temperature sensor resistor 7, and the resistance value RD2 of the temperature sensor resistor 8 is generally the same as the resistance value RU2 of the temperature sensor resistor 9. Thus, in the no-flow state of the air, the midpoint electric potential VA at the midpoint connection between the temperature sensor resistor 6 and the temperature sensor resistor 7 in the first series circuit A is the same as the midpoint electric potential VB at the midpoint connection between the temperature sensor resistor 8 and the temperature sensor resistor 9 in the second series circuit B, so that a midpoint electric potential difference (VA−VB) of the bridge circuit X, i.e., an electric potential difference between the midpoint electric potential VA and the midpoint electric potential VB is 0 (zero).

Furthermore, as shown in FIGS. 1 and 2, when the air flows from the upstream side (the air cleaner side, i.e., the left side in FIG. 2) to the downstream side (the engine side, i.e., the right side in FIG. 2) in the intake pipe 1, a center point of the temperature distribution, which is developed on the membrane 25 of the sensor chip 3 is displaced from a center point of the heater resistor 5 toward the downstream side. Therefore, the temperatures of the upstream-side temperature sensor resistors 6, 9, which are located on the upstream side of the heater resistor 5, are reduced, and the temperatures of the downstream-side temperature sensor resistors 7, 8, which are located on the downstream side of the heater resistor 5, are increased. Thereby, for instance, the resistance value of the upstream-side temperature sensor resistor 6 and the resistance value of the upstream-side temperature sensor resistor 9 are decreased, and the resistance value of the downstream-side temperature sensor resistor 7 and the resistance value of the downstream-side temperature sensor resistor 8 are increased.

Thus, in such a state, the electric potential difference between the first series circuit A and the second series circuit B (i.e., the midpoint electric potential difference: VA−VB) in the bridge circuit X is no longer zero. In this instance, the electric potential difference between the first series circuit A and the second series circuit B (i.e., the midpoint electric potential difference: VA−VB) in the bridge circuit X is a positive value.

In contrast, when the air flows from the downstream side to the upstream side in the intake pipe 1, the center point of the temperature distribution, which is developed on the membrane 25 of the sensor chip 3 is displaced from the center point of the heater resistor 5 toward the upstream side. Therefore, the temperatures of the upstream-side temperature sensor resistors 6, 9, which are located on the upstream side of the heater resistor 5, are increased, and the temperatures of the downstream-side temperature sensor resistors 7, 8, which are located on the downstream side of the heater resistor 5, are decreased. Therefore, in such an instance, the electric potential difference between the first series circuit A and the second series circuit B (i.e., the midpoint electric potential difference: VA−VB) in the bridge circuit X is a negative value.

As discussed above, the midpoint electric potential difference (VA−VB) in the bridge circuit X becomes the positive value or the negative value depending on the flow direction of the air. Thus, the flow direction of the air is sensed by determining whether the midpoint electric potential difference (VA−VB) in the bridge circuit X is the positive value or the negative value. In addition, when the flow quantity of the air becomes large, the temperature distribution, which is developed on the membrane 25 of the sensor chip 3, is largely displaced. Thereby, the resistance values RU1, RD1, RD2, RU2 of the temperature sensor resistors 6-9 are largely changed, and thereby the midpoint electric potential difference (VA−VB) in the bridge circuit X is also largely changed. As discussed above, a correlation exists between the flow quantity of the air and the midpoint electric potential difference. Thereby, the flow quantity of the air can be sensed by measuring an absolute value of the midpoint electric potential difference (VA−VB) of the bridge circuit X.

Details of the bridge circuit X, particularly the first series circuit A and the second series circuit B of the bridge circuit X will be described later.

As shown in FIGS. 2 and 3, the temperature control circuit of the heater resistor 5 includes a bridge circuit (also referred to as a second bridge circuit) Y, a differential amplifier 27 and the transistor 28. The bridge circuit Y is formed as a thin film on the sensor chip 3. The differential amplifier 27 and the transistor 28 are formed on the control circuit chip 4.

The bridge circuit Y includes two series circuits, i.e., a third series circuit C and a fourth series circuit D, which are connected with each other in parallel. The third series circuit C is a circuit, in which the heater resistor 5 and the fixed resistor 12 are connected with each other in series. The fourth series circuit D is a circuit, in which the temperature sensor resistor 13 and the fixed resistor 14 are connected with each other in series.

The transistor 28 is connected to the connection between the fixed resistor 12 and the fixed resistor 14 and is operated upon receiving a constant voltage. An electric potential of a connecting point between the heater resistor 5 and the temperature sensor resistor 13 is a ground (GND) electric potential.

The temperature control circuit of the heater resistor 5 is constructed to control a heating electric current, which flows through the heater resistor 5 to heat the same, in response the heating temperature of the heater resistor 5 and the temperature of the intake air (also referred to as an intake air temperature), which is sensed with the temperature sensor resistor 13.

Specifically, the heating electric current, which flows through the heater resistor 5, is generated through the transistor 28. Furthermore, a bridge output voltage (an electric potential difference between a midpoint electric potential of the third series circuit C and a midpoint electric potential of the fourth series circuit D, i.e., VC-VD) of the bridge circuit Y is obtained, and the transistor 28 is feedback controlled such that the bridge output voltage of the bridge circuit Y becomes a predetermined voltage value (e.g., 0 V), so that the heating electric current, which flows through the heater resistor 5, is variably controlled. Because of the feedback control of the transistor 28 through the differential amplifier 27, the heating temperature Th of the heater resistor 5 becomes always higher than the atmospheric temperature (intake air temperature: TK), which is sensed with the temperature sensor resistor 13, by a predetermined amount ΔT (=Th−TK).

The temperature sensor resistor 13 is a temperature sensing resistor, a resistance value of which changes depending on the temperature around the resistor, i.e., the temperature of the intake air. Furthermore, the temperature sensor resistor 13 is placed at a corresponding location on the sensor chip 3 (the location that is outside of the membrane 25 on the sensor chip 3) where the heat, which is generated from the heater resistor 5, does not have a substantial influence on the temperature sensor resistor 13. The temperature sensor resistor 13 serves as a temperature sensitive resistor, which senses the temperature of the air. The temperature sensor resistor 13 is a resistor, which is made of the same material as that of the heater resistor 5. However, since it is not necessary to generate the high temperature heat from the temperature sensor resistor 13 unlike the heater resistor 5, the resistance value of the heater resistor 5 is set to be smaller than that of the heater resistor 5.

Each of the fixed resistors 12, 14 is placed at a corresponding location on the sensor chip 3 (the location that is outside of the membrane 25 on the sensor chip 3) where the heat, which is generated from the heater resistor 5, does not have an influence on the fixed resistor 12, 14. The fixed resistors 12, 14 are arranged symmetrically about a center line of the heater resistor 5 and are turned, i.e., are bent for at least four times to form a maze structure. The center line of the heater resistor 5 extends along a plane of the sensor chip 3 (and thereby of the circuit board 10) in a direction (top-to-bottom direction in FIG. 2) that is generally perpendicular to the flow direction of the intake air. Furthermore, the fixed resistor 14 and the temperature sensor resistor 13 are symmetrical about a center line, which extends through a midpoint connection between the fixed resistor 14 and the temperature sensor resistor 13 in the flow direction of the air, i.e., the left-to-right direction in FIG. 2.

Details of the bridge circuit Y, particularly the third and fourth series circuits C, D of the bridge circuit Y will be described later.

Next, details of the flow quantity sensing circuit of the air flow meter, particularly the bridge circuit X according to the present embodiment will be described with reference to FIGS. 2 and 3.

As discussed above, the bridge circuit X includes the first series circuit A and the second series circuit B, which are connected with each other in parallel. In the first series circuit A, the temperature sensor resistor 6 and the temperature sensor resistor 7, which are generally identical in shape and have generally the identical temperature coefficient of resistance, are connected with each other in series. In the second series circuit B, the temperature sensor resistor 8 and the temperature sensor resistor 9, which are generally identical in shape and have generally the identical temperature coefficient of resistance, are connected with each other in series.

The temperature sensor resistor 6 and the temperature sensor resistor 7 are generally identically configured into a U-shape and have generally the identical temperature characteristic, i.e., the identical characteristic with respect to the change in the resistance value relative to the temperature. The temperature sensor resistor 8 and the temperature sensor resistor 9 are generally identically configured into a U-shape and have generally the identical temperature characteristic, i.e., the identical characteristic with respect to the change in the resistance value relative to the temperature.

The bridge circuit X includes a first conductive line 31, through which the midpoint electric potential VA of the first series circuit A is outputted toward the differential amplifier 26. A first connecting conductive line 32, which connects between the temperature sensor resistor 6 and the temperature sensor resistor 7 in series, is provided to the first series circuit A. A first midpoint connection (serving as a first connection) 33 is provided to the midpoint of the first connecting conductive line 32, and an end portion of the first conductive line 31, which is opposite from the electrode pad of the first conductive line 31, is connected to the first midpoint connection 33.

Thereby, the first conductive line 31 is branched from the midpoint of the first connecting conductive line 32 of the first series circuit A on the sensor chip 3. That is, in the first series circuit A of the bridge circuit X, the output point of the midpoint electric potential VA is provided at the midpoint between the temperature sensor resistor 6 and the temperature sensor resistor 7.

The bridge circuit X further includes a second conductive line 34, through which the midpoint electric potential VB of the second series circuit B is outputted toward the differential amplifier 26. A second connecting conductive line 35, which connects between the temperature sensor resistor 8 and the temperature sensor resistor 9 in series, is provided to the second series circuit B. A second midpoint connection (serving as a second connection) 36 is provided to the midpoint of the second connecting conductive line 35, and an end portion of the second conductive line 34, which is opposite from the electrode pad of the second conductive line 34, is connected to the second midpoint connection 36.

Thereby, the second conductive line 34 is branched from the midpoint of the second connecting conductive line 35 of the second series circuit B on the sensor chip 3. That is, in the second series circuit B of the bridge circuit X, the output point of the midpoint electric potential VB is provided at the midpoint between the temperature sensor resistor 8 and the temperature sensor resistor 9.

The first midpoint connection 33 and the second midpoint connection 36 are placed along the center line of the heater resistor 5 at a corresponding location on the sensor chip 3 (the location that is outside of the membrane 25 on the sensor chip 3) where the heat generated from the heater resistor 5 has no substantial influence on the first and second midpoint connections 33, 36. Furthermore, in the bridge circuit X, widths of the first and second conductive lines 31, 34, through which the midpoint electric potentials VA, VB of the first and second series circuits A, B are respectively outputted, are narrower, i.e., smaller than a width of the first connecting conductive line 32, which connects between the temperature sensor resistor 6 and the temperature sensor resistor 7, and a width of the second connecting conductive line 35, which connects between the temperature sensor resistor 8 and the temperature sensor resistor 9.

The group of electrode pads of the sensor chip 3, particularly the group of electrode pads, which are used in the flow quantity sensing circuit of the air flow meter, includes a first electrode pad 37, a second electrode pad 38 and four electrode pads 45-48. The first electrode pad 37 is formed at the electrode pad side end portion of the first conductive line 31 of the first series circuit A. The second electrode pad 38 is formed at the electrode pad side end portion of the second conductive line 34 of the second series circuit B. The electrode pads 45-48 are formed at the electrode pad side end portions, respectively, of four resistor conductive lines 41-44.

The first electrode pad 37 and the second electrode pad 38 are electrically connected to the differential amplifier 26 of the control circuit chip 4 through, for example, bonding wires, respectively. That is, the flow quantity sensing circuit of the air flow meter is constructed such that the midpoint electric potential difference (VA−VB) of the bridge circuit X, which is outputted through the first and second conductive lines 31, 34, is inputted to the differential amplifier 26 through input terminals of the differential amplifier 26.

The resistor conductive line 41 electrically connects between the temperature sensor resistor 9 and the electrode pad 45. The resistor conductive line 42 electrically connects between the temperature sensor resistor 6 and the electrode pad 46. The resistor conductive line 43 electrically connects between the temperature sensor resistor 7 and the electrode pad 47. The resistor conductive line 44 electrically connects between the temperature sensor resistor 8 and the electrode pad 48.

Similar to the heater resistor 5, the first and second conductive lines 31, 34, the first and second connecting conductive lines 32, 35 and the resistor conductive lines 41-44 are respectively formed as a thin film of platinum (Pt), polycrystalline silicon (Poly-Si) or single crystal silicon through the vacuum vapor deposition process or the spattering process.

Next, the details of the temperature control circuit of the heater resistor 5, particularly of the bridge circuit Y will be described with reference to FIGS. 2 and 3.

As discussed above, the bridge circuit Y includes the third series circuit C and the fourth series circuit D, which are connected with each other in parallel. In the third series circuit C, the heater resistor 5 and the fixed resistor 12 are connected with each other in series. In the fourth series circuit D, the temperature sensor resistor 13 and the fixed resistor 14, which are generally identical in shape and have generally the identical temperature coefficient of resistance, are connected with each other in series.

The heater resistor 5 includes two parallel heater resistor portions and one connecting heater resistor portion. The parallel heater resistor portions extend parallel to each other in a longitudinal direction of the sensor chip 3 (i.e., a direction perpendicular to the flow direction of the air). The connecting heater resistor portion interconnects between one end parts of the parallel heater resistor portions, which are opposite from resistor conductive lines 61-64 discussed later. The center line of the heater resistor 5 is a straight line, which extends through a center of the connecting resistor portion of the heater resistor 5 and is generally perpendicular to the flow direction of the air.

The bridge circuit Y further includes a third conductive line 51, through which the midpoint electric potential VC of the third series circuit C is outputted toward the differential amplifier 27. A third connecting conductive line 52, which connects between the heater resistor 5 and the fixed resistor 12 in series, is provided to the third series circuit C. A third midpoint connection (serving as a third connection) 53 is provided to the midpoint of the third connecting conductive line 52, and an end portion of the third connecting conductive line 52, which is opposite from the electrode pad of the third conductive line 51, is connected to the third midpoint connection 53.

Thereby, the third conductive line 51 is branched from the midpoint of the third connecting conductive line 52 of the third series circuit C on the sensor chip 3. That is, in the third series circuit C of the bridge circuit Y, the output point of the midpoint electric potential VC is provided at the midpoint between the heater resistor 5 and the fixed resistor 12.

The bridge circuit Y further includes a fourth conductive line 54, through which the midpoint electric potential VD of the fourth series circuit D is outputted toward the differential amplifier 27. A fourth connecting conductive line 55, which connects between the temperature sensor resistor 13 and the fixed resistor 14, is provided to the fourth series circuit D. A fourth midpoint connection (serving as a fourth connection) 56 is provided to the midpoint of the fourth connecting conductive line 55, and an end portion of the fourth conductive line 54, which is opposite from the electrode pad of the fourth conductive line 54, is connected to the fourth midpoint connection 56.

Thereby, the fourth conductive line 54 is branched from the midpoint of the fourth connecting conductive line 55 of the fourth series circuit D on the sensor chip 3. That is, in the fourth series circuit D of the bridge circuit Y, the output point of the midpoint electric potential VD is provided at the midpoint between the temperature sensor resistor 13 and the fixed resistor 14.

The group of electrode pads of the sensor chip 3, particularly the group of electrode pads, which are used in the temperature control circuit of the heater resistor 5, includes a third electrode pad 57, a fourth electrode pad 58 and four electrode pads 65-68. The third electrode pad 57 is formed at the electrode pad side end portion of the third conductive line 51 of the third series circuit C. The fourth electrode pad 58 is formed at the electrode pad side end portion of the fourth conductive line 54 of the fourth series circuit D. The electrode pads 65-68 are formed at the electrode pad side end portions, respectively, of the resistor conductive lines 61-64.

The third electrode pad 57 and the fourth electrode pad 58 are electrically connected to the differential amplifier 27 of the control circuit chip 4 through, for example, bonding wires, respectively. The temperature control circuit of the heater resistor 5 is constructed such that the midpoint electric potential difference (VC-VD) of the bridge circuit Y, which is outputted through the third and fourth conductive lines 51, 54, is inputted to the differential amplifier 27 through input terminals of the differential amplifier 27.

The resistor conductive line 61 electrically connects between the temperature sensor resistor 13 and the electrode pad 65. The resistor conductive line 62 electrically connects between the fixed resistor 14 and the electrode pad 66. The resistor conductive line 63 electrically connects between the heater resistor 5 and the electrode pad 67. The resistor conductive line 64 electrically connects between the fixed resistor 12 and the electrode pad 68.

Similar to the heater resistor 5, the third and fourth conductive lines 51, 54, the third and fourth connecting conductive lines 52, 55 and the resistor conductive lines 61-64 are respectively formed as a thin film of platinum (Pt), polycrystalline silicon (Poly-Si) or single crystal silicon through the vacuum vapor deposition process or the spattering process.

As discussed above, the air flow quantity measuring apparatus of the present embodiment includes the flow quantity sensing circuit of the air flow meter, which includes the bridge circuit X formed by connecting the first and second series circuits A, B in parallel, and the temperature control circuit of the heater resistor 5, which includes the bridge circuit Y formed by connecting the third and fourth series circuits C, D in parallel. The bridge circuit X and the bridge circuit Y are formed on the sensor chip 3. Furthermore, the heater resistor 5, the temperature sensor resistors 6, 7 and the temperature sensor resistors 8, 9 are formed as the thin films, respectively, of platinum (Pt), polycrystalline silicon (Poly-Si) or single crystal silicon on the membrane 25 of the sensor chip 3. The heater resistor 5 generates the high temperature heat upon receiving the electric power. The temperature sensor resistors 6, 7 are placed on the upstream side and the downstream side, respectively, of the heater resistor 5 and are connected in series. The temperature sensor resistors 9, 8 are placed on the upstream side and the downstream side, respectively, of the heater resistor 5 and are connected in series.

Furthermore, in the bridge circuit X, the widths of the first and second conductive lines 31, 34, through which the midpoint electric potentials VA, VB of the first and second series circuits A, B are respectively outputted, are narrower, i.e., smaller than the width of the first connecting conductive line 32, which connects between the temperature sensor resistor 6 and the temperature sensor resistor 7, and the width of the second connecting conductive line 35, which connects between the temperature sensor resistor 8 and the temperature sensor resistor 9. Furthermore, the widths of the first and second conductive lines 31, 34 are narrower (smaller) than the widths of the resistor conductive lines 41-44. In this way, the widths of the first and second conductive lines 31, 34, which do not substantially conduct the electric current and through which the midpoint electric potentials are outputted, are made narrow, so that the first and second conductive lines 31, 34 can be placed on the sensor chip 3 while minimizing the installation space thereof on the sensor chip 3. Thereby, the size of the rectangular sensor chip 3, which is measured in the lateral direction (width direction) of the rectangular sensor chip 3, i.e., in the flow direction of the air, can be reduced or minimized, and thereby the size of the air flow meter can be reduced or minimized.

The output point of the midpoint electric potential of the first series circuit A is placed in the midpoint between the temperature sensor resistor 6 and the temperature sensor resistor 7, and the first midpoint connection 33 is placed along the center line of the heater resistor 5. In this way, the temperature characteristics of the resistance values of the temperature sensor resistors 6, 7, which are connected with each other in series, become generally identical to have the required pair characteristics of the temperature sensor resistors 6, 7 with respect to the temperature characteristics of the resistance thereof. Thus, the detection sensitivity for detecting, i.e., sensing the air flow quantity can be improved. Furthermore, a length of the first connecting conductive line 32, which connects between the temperature sensor resistors 6, 7 in series, can be reduced in comparison to the prior art product, so that the conductive line resistance (or simply referred to as the resistance) of the first connecting conductive line 32 can be reduced. Thus, the detection sensitivity for detecting, i.e., sensing the air flow quantity can be improved.

The output point of the midpoint electric potential of the second series circuit B is placed in the midpoint between the temperature sensor resistor 8 and the temperature sensor resistor 9, and the second midpoint connection 36 is placed along the center line of the heater resistor 5. In this way, the temperature characteristics of the resistance values of the temperature sensor resistors 8, 9, which are connected with each other in series, become generally identical to each other, thereby maintaining the pair characteristics of the temperature sensor resistors 8, 9 with respect to the temperature characteristic of the resistance thereof. Thus, the detection sensitivity for detecting, i.e., sensing the air flow quantity can be improved. Furthermore, a length of the second connecting conductive line 35, which connects between the temperature sensor resistors 8, 9 in series, can be reduced in comparison to the prior art product, so that the conductive line resistance (or simply referred to as the resistance) of the second connecting conductive line 35 can be reduced. Thus, the detection sensitivity for detecting, i.e., sensing the air flow quantity can be improved.

Furthermore, in the bridge circuit X of the air flow quantity measuring apparatus, in which the first and second series circuits A, B are connected with each other in parallel, the first conductive line 31, through which the midpoint electric potential VA of the first series circuit A is outputted, is branched from the first midpoint connection 33 of the first series circuit A on the sensor chip 3. Also, the second conductive line 34, through which the midpoint electric potential VB of the second series circuit B is outputted, is branched from the second midpoint connection 36 of the second series circuit B on the sensor chip 3. That is, the first and second midpoint connections 33, 36 are placed on the sensor chip 3. The first and second conductive lines 31, 34 are branched from the midpoints, respectively, of the first and second connecting conductive lines 32, 35 of the first and second series circuits A, B on the sensor chip 3.

In this way, the first and second midpoint connections 33, 36 are not covered with the molded resin that covers and protects the control circuit chip 4, which is located outside of the sensor chip 3, and the bonding wires, which are connected with the control circuit chip 4, and the associated electrode pads. Thus, it is possible to alleviate an influence of variations in the resistance value (including the variations in the conductive line resistance value and the variations in the temperature coefficient of resistance) of, for example, the temperature sensor resistors 6-9 caused by the stress applied to the sensor chip 3.

Furthermore, in the temperature control circuit of the heater resistor 5 of the present embodiment, the third conductive line 51, through which the midpoint electric potential VC of the third series circuit C is outputted, is branched from the third midpoint connection 53 of the third series circuit C in the bridge circuit Y, in which the third series circuit C and the fourth series circuit D are connected with each other in parallel. That is, the output point (location) of the third series circuit C, from which the midpoint electric potential of the third series circuit C is outputted, is provided in the midpoint between the heater resistor 5 and the fixed resistor 12. Furthermore, the fourth conductive line 54, through which the midpoint electric potential VD of the fourth series circuit D is outputted, is branched from the fourth midpoint connection 56 of the fourth series circuit D on the sensor chip 3. That is, the output point (location) of the fourth series circuit D, from which the midpoint electric potential of the fourth series circuit D is outputted, is provided in the midpoint between the temperature sensor resistor 13 and the fixed resistor 14.

Therefore, a length of the third connecting conductive line 52, which connects between the heater resistor 5 and the fixed resistor 12 in series, can be reduced in comparison to the prior art product, so that the conductive line resistance (or simply referred to as the resistance) of the third connecting conductive line 52 can be reduced. Thereby, the detection sensitivity for detecting, i.e., sensing the air flow quantity and the control sensitivity (accuracy) for controlling the heater resistor 5 can be improved. Furthermore, a length of the fourth connecting conductive line 55, which connects between the temperature sensor resistor 13 and the fixed resistor 14 in series, can be reduced in comparison to the prior art product, so that the conductive line resistance (or simply referred to as the resistance) of the fourth connecting conductive line 55 can be reduced. Thereby, the detection sensitivity for detecting, i.e., sensing the air flow quantity and the control sensitivity (accuracy) for controlling the heater resistor 5 can be improved.

In this way, the third and fourth midpoint connections 53, 56 are not covered with the molded resin that covers and protects the control circuit chip 4, which is located outside of the sensor chip 3, and the bonding wires, which are connected with the control circuit chip 4, and the associated electrode pads. Thus, it is possible to alleviate an influence of variations in the resistance value (including the variations in the conductive line resistance value and the variations in the temperature coefficient of resistance) of, for example, the heater resistor 5, the temperature sensor resistor 13 and the fixed resistors 12, 14 caused by the stress applied to the sensor chip 3.

Second Embodiment

Figure 4:
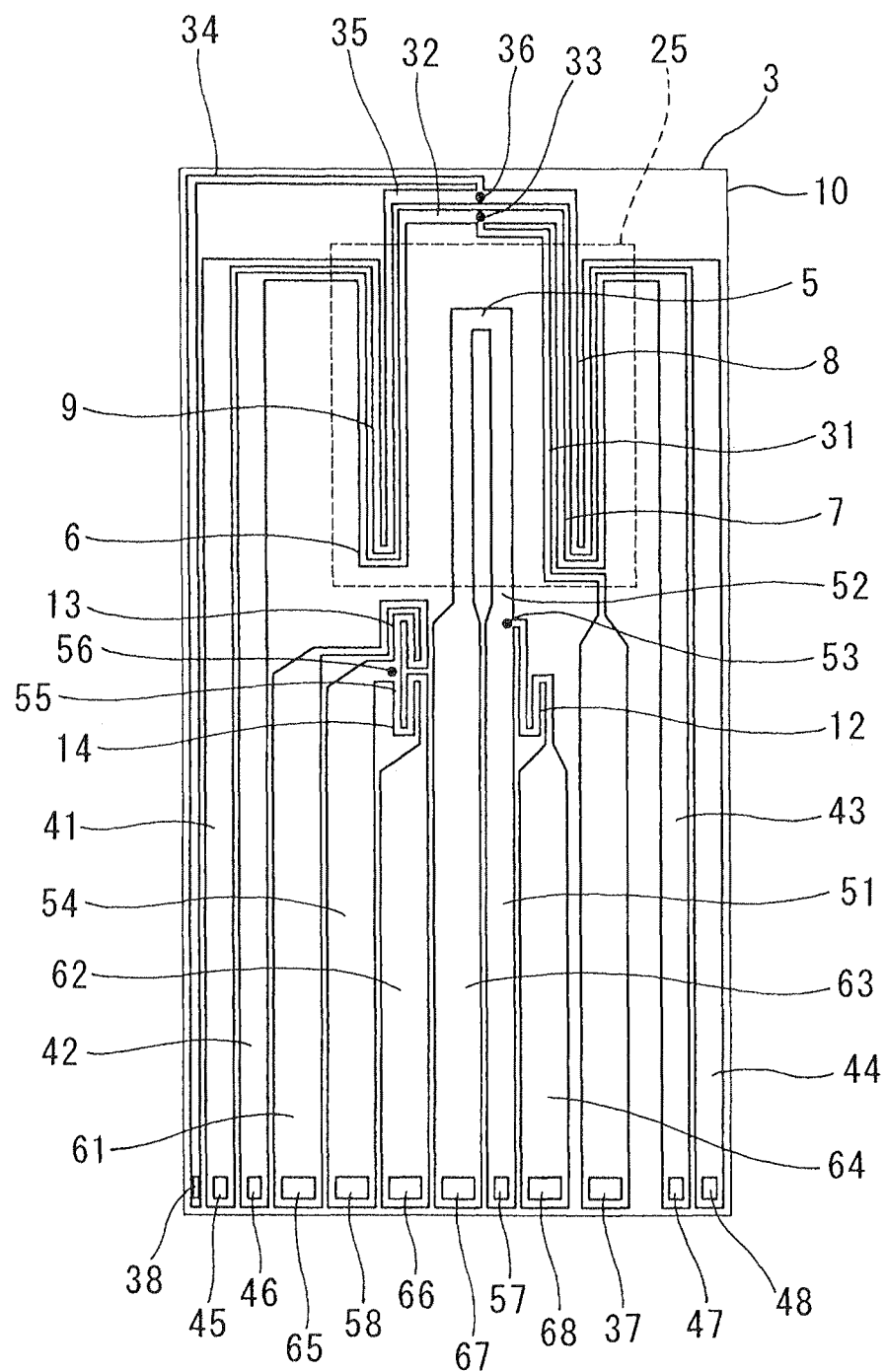
FIG. 4 is a plan view of a sensor chip of an air flow quantity measuring apparatus according to a second embodiment of the present invention.

FIG. 4 shows a second embodiment of the present invention. More specifically, FIG. 4 is a diagram showing a sensor chip of an air flow quantity measuring apparatus of the second embodiment of the present invention.

The flow quantity sensing circuit of the air flow meter of the present embodiment includes the first and second series circuits A, B, which are connected with each other in parallel.

Similar to the first embodiment, the temperature control circuit of the heater resistor 5 includes the bridge circuit Y, in which the third and fourth series circuits C, D are connected with each other in parallel.

In this bridge circuit Y, the conductive line width of the third conductive line 51, through which the midpoint electric potential VC of the third series circuit C is outputted, is narrower (smaller) than the conductive line widths of the resistor conductive lines 63, 64. In this way, the width of the third conductive line 51, through which the midpoint electric potential is outputted, becomes small, so that the third conductive line 51 can be installed on the sensor chip 3 with a smaller installation space thereof.

Thereby, the size of the rectangular sensor chip 3, which is measured in the lateral direction (width direction) of the rectangular sensor chip 3, i.e., in the flow direction of the air, can be reduced or minimized, and thereby the size of the air flow meter can be reduced or minimized.

Here, it should be noted that a width of the fourth conductive line 54, through which the midpoint electric potential VD of the fourth series circuit D is outputted, may be made narrower (smaller) that the fourth connecting conductive line 55, which connects between the temperature sensor resistor 13 and the fixed resistor 14, if desired.

Third Embodiment

Figure 5:
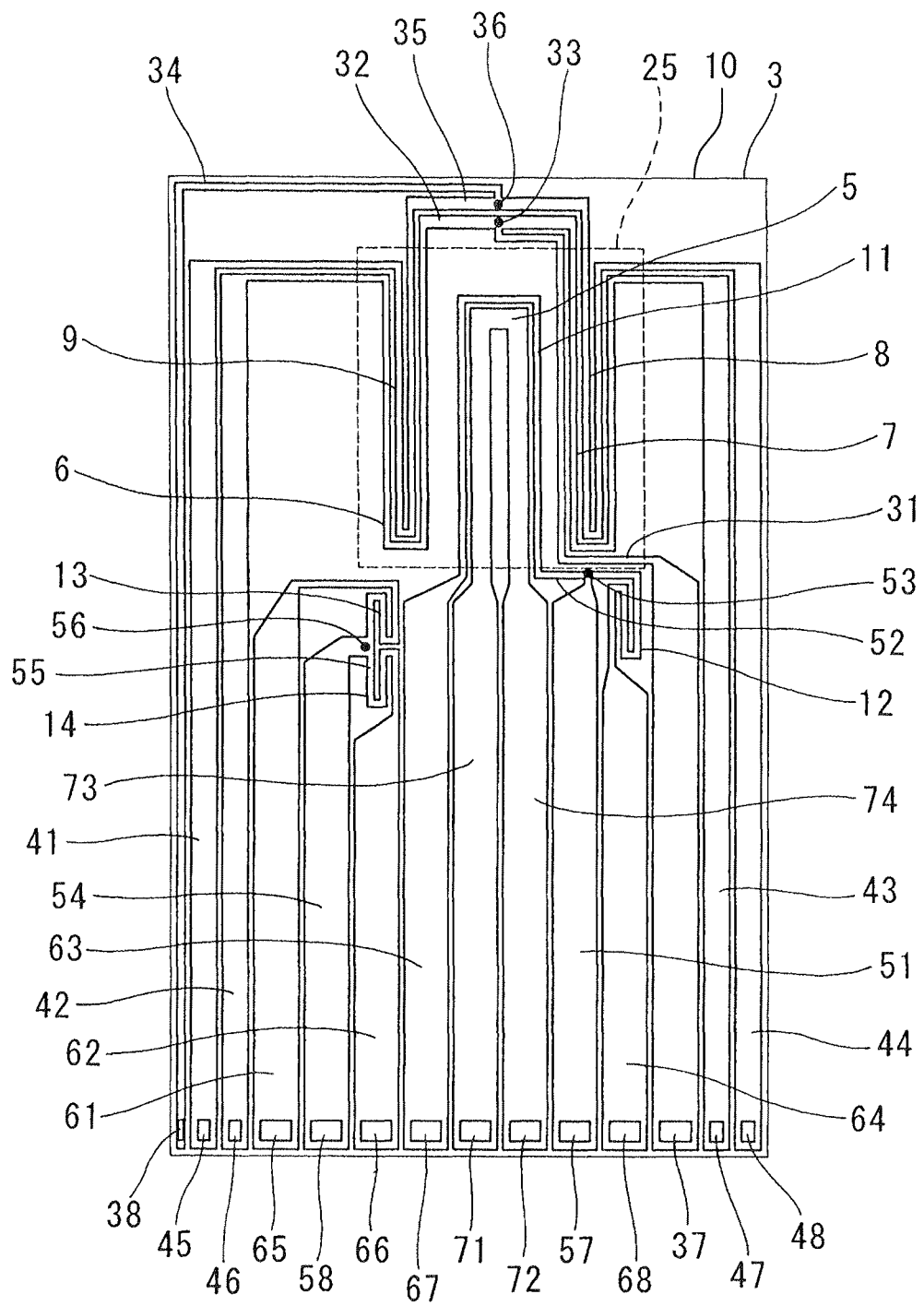
FIG. 5 is a plan view of a sensor chip of an air flow quantity measuring apparatus according to a third embodiment of the present invention.
Figure 6:
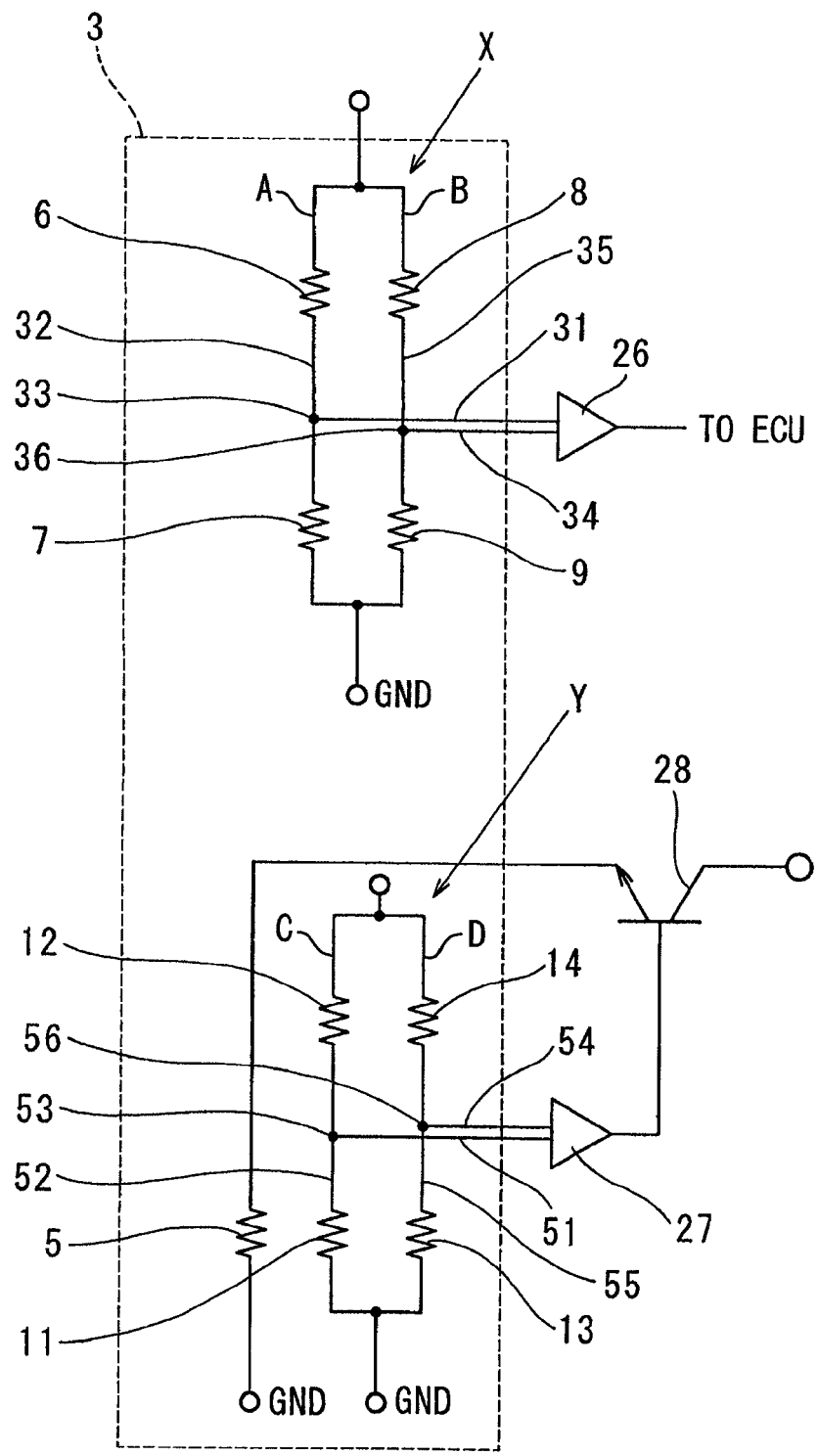
FIG. 6 is a circuit diagram showing a circuit structure of the air flow quantity measuring apparatus of the third embodiment.

FIGS. 5 and 6 show a third embodiment of the present invention. Specifically, FIG. 5 is a diagram showing a sensor chip of an air flow quantity measuring apparatus of the third embodiment, and FIG. 6 is a diagram showing a circuit structure of the air flow quantity measuring apparatus of the third embodiment.

A temperature control circuit of the heater resistor 5 of the present embodiment has a bridge circuit Y that has third and fourth series circuits C, D, which are connected with each other in parallel. In the third series circuit C, an indirectly heated resistor 11 and the fixed resistor 12 are connected with each other in series. In the fourth series circuit D, the temperature sensor resistor 13 and the fixed resistor 14 are connected with each other in series.

The indirectly heated resistor 11 is a temperature sensing resistor, a resistance value RI of which changes upon receiving the heat of the heater resistor 5. The indirectly heated resistor 11 is placed in a corresponding location of the membrane 25 of the sensor chip 3, at which the indirectly heated resistor 11 is under influence of the heat generated from the heater resistor 5.

A predetermined supply voltage (power source voltage) is applied to an intermediate connecting point between the fixed resistor 12 and the fixed resistor 14. An electric potential of a connecting point between the indirectly heated resistor 11 and the temperature sensor resistor 13 is a ground (GND) electric potential.

The bridge circuit Y of the present embodiment further includes the third conductive line 51, through which the midpoint electric potential VC of the third series circuit C is outputted. The third series circuit C includes the third connecting conductive line 52, which connects between the indirectly heated resistor 11 and the fixed resistor 12 in series. The third midpoint connection 53 is provided to the midpoint of the third connecting conductive line 52, and an end portion of the third connecting conductive line 52, which is opposite from the electrode pad of the third conductive line 51, is connected to the third midpoint connection 53.

Thereby, the third conductive line 51 is branched from the midpoint of the third connecting conductive line 52 of the third series circuit C on the sensor chip 3. That is, in the third series circuit C of the bridge circuit Y, the output point of the midpoint electric potential VC is provided at the midpoint between the indirectly heated resistor 11 and the fixed resistor 12.

The group of electrode pads of the sensor chip 3, particularly the group of electrode pads, which are used in the temperature control circuit of the heater resistor 5, includes an electrode pad 71 and an electrode pad 72 besides the third and fourth electrode pads 57, 58 and the four electrode pads 65-68.

The electrode pad 65 is electrically connected to the temperature sensor resistor 13 through the resistor conductive line 61. The electrode pad 66 is electrically connected to the fixed resistor 14 through the resistor conductive line 62. The electrode pad 67 is electrically connected to the indirectly heated resistor 11 through the resistor conductive line 63. The electrode pad 68 is electrically connected to the fixed resistor 12 through the resistor conductive line 64.

The electrode pad 71 is electrically connected to the heater resistor 5 through a resistor conductive line 73. The electrode pad 71 is electrically connected to the transistor 28 of the control circuit chip 4 through a bonding wire. The electrode pad 72 is electrically connected to the heater resistor 5 through a resistor conductive line 74. An electric potential of the electrode pad 72 is a ground (GND) electric potential.

Similar to the third and fourth conductive lines 51, 54, the third and fourth connecting conductive lines 52, 55 and the four resistor conductive lines 61-64, the electrode pad 71 and the electrode pad 72 are respectively formed as a thin film of platinum (Pt), polycrystalline silicon (Poly-Si) or single crystal silicon through the vacuum vapor deposition process or the spattering process.

The temperature control circuit of the heater resistor 5 includes the differential amplifier 27 and the transistor 28 besides the bridge circuit Y and variably controls the heating electric current, which flows through the heater resistor 5, such that the temperature of the indirectly heated resistor 11 becomes higher than the intake air temperature, which is sensed with the temperature sensor resistor 13, by a predetermined amount (predetermined temperature) in response to the intake air temperature sensed with the temperature sensor resistor 13.

Specifically, the heating electric current (or a drive voltage applied to the heater resistor 5) is generated through the transistor 28, which is operated upon receiving the constant voltage. Also, the midpoint electric potential difference (VC-VD), which is the bridge output voltage of the bridge circuit Y, is obtained through the differential amplifier 27. Then, the transistor 28 is feedback controlled such that the bridge output voltage of the bridge circuit Y becomes a predetermined voltage value (e.g., 0 V), so that the heating electric current, which flows through the heater resistor 5, is variably controlled. Because of the feedback control of the transistor 28 through the differential amplifier 27, the heating temperature Th of the heater resistor 5 becomes always higher than the atmospheric temperature (intake air temperature: TK), which is sensed with the temperature sensor resistor 13, by the predetermined amount $\Delta T$ (=Th−TK).

As discussed above, the air flow quantity measuring apparatus of the present embodiment can provide advantages, which are similar to those of the first embodiment.

Specifically, the third conductive line 51, through which the midpoint electric potential VC of the third series circuit C is outputted, is branched from the third midpoint connection 53 of the third series circuit C on the sensor chip 3. That is, the output point (location) of the third series circuit C, from which the midpoint electric potential of the third series circuit C is outputted, is provided in the midpoint between the indirectly heated resistor 11 and the fixed resistor 12.

Therefore, a length of the third connecting conductive line 52, which connects between the indirectly heated resistor 11 and the fixed resistor 12 in series, can be reduced in comparison to the prior art product, so that the conductive line resistance (or simply referred to as the resistance) of the third connecting conductive line 52 can be reduced. Thereby, the detection sensitivity for detecting, i.e., sensing the air flow quantity and the control sensitivity (accuracy) for controlling the heater resistor 5 can be improved.

In this way, the third and fourth midpoint connections 53, 56 are not covered with the molded resin that covers and protects the control circuit chip 4, which is located outside of the sensor chip 3, and the bonding wires, which are connected with the control circuit chip 4, and the associated electrode pads. Thus, it is possible to alleviate an influence of variations in the resistance value (including the variations in the conductive line resistance value and the variations in the temperature coefficient of resistance) of, for example, the indirectly heated resistor 11, the temperature sensor resistor 13 and the fixed resistors 12, 14 caused by the stress applied to the sensor chip 3.

Fourth Embodiment

Figure 7:
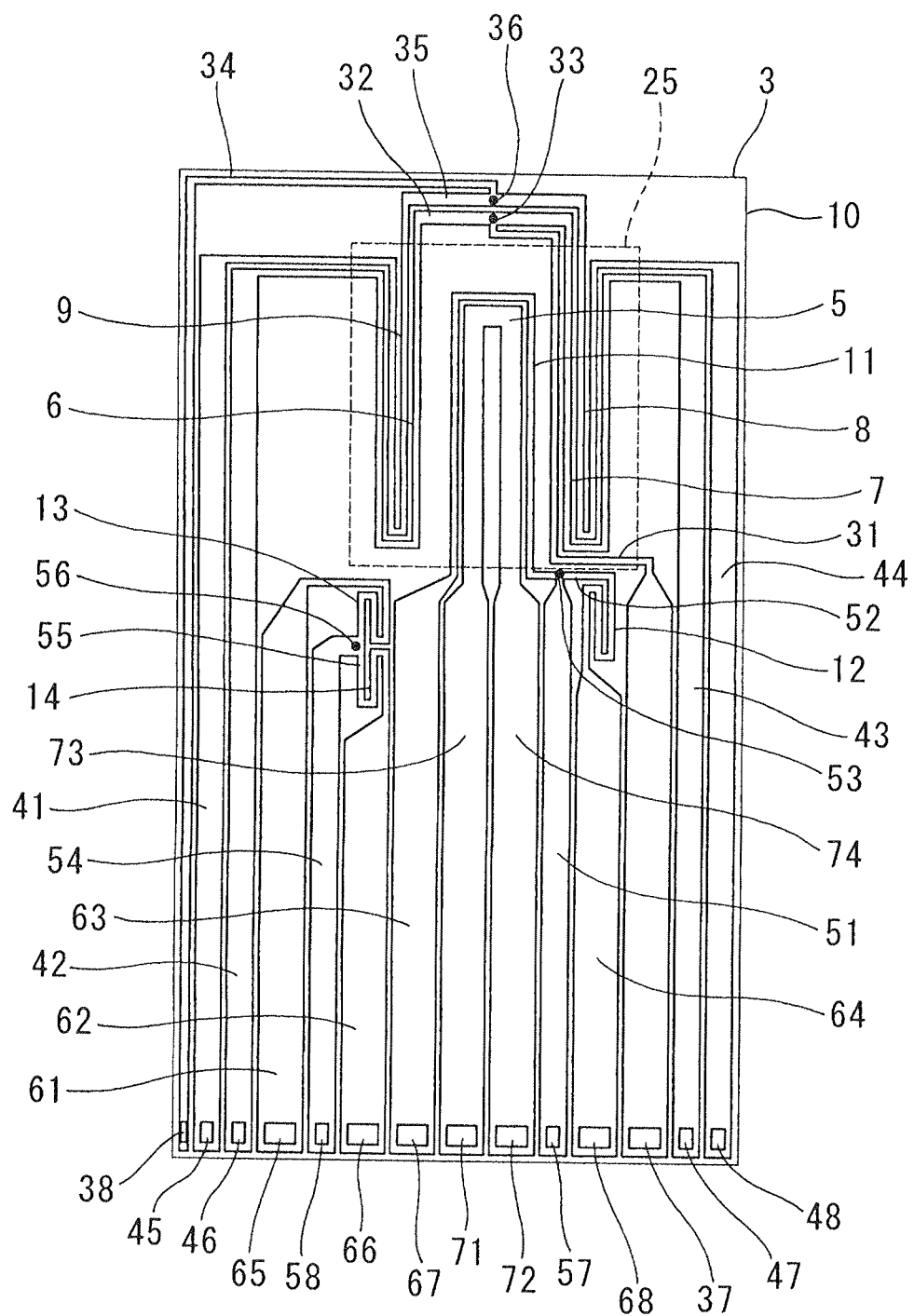
FIG. 7 is a plan view of a sensor chip of an air flow quantity measuring apparatus according to a fourth embodiment of the present invention.

FIG. 7 shows a fourth embodiment of the present invention. More specifically, FIG. 7 is a diagram showing a sensor chip of an air flow quantity measuring apparatus of the fourth embodiment.

Similar to the third embodiment, the temperature control circuit of the heater resistor 5 of the present embodiment includes the bridge circuit Y, in which the third and fourth series circuits C, D are connected with each other in parallel.

In this bridge circuit Y, the widths of the third and fourth conductive lines 51, 54, through which the midpoint electric potentials VC, VD of the third and fourth series circuits C, D are respectively outputted, are narrower (smaller) than the widths of the resistor conductive lines 63, 64 and the widths of the resistor conductive lines 61, 62. In this way, the widths of the third and fourth conductive lines 51, 54, from which the midpoint electric potentials VC, VD of the third and fourth series circuits C, D are respectively outputted, are made narrower, so that the third and fourth conductive lines 51, 54 can be installed on the sensor chip 3 while minimizing the installation space thereof on the sensor chip 3.

Thereby, the size of the rectangular sensor chip 3, which is measured in the lateral direction (width direction) of the rectangular sensor chip 3, i.e., in the flow direction of the air, can be reduced or minimized, and thereby the size of the air flow meter can be reduced or minimized.

Fifth Embodiment

Figure 8:
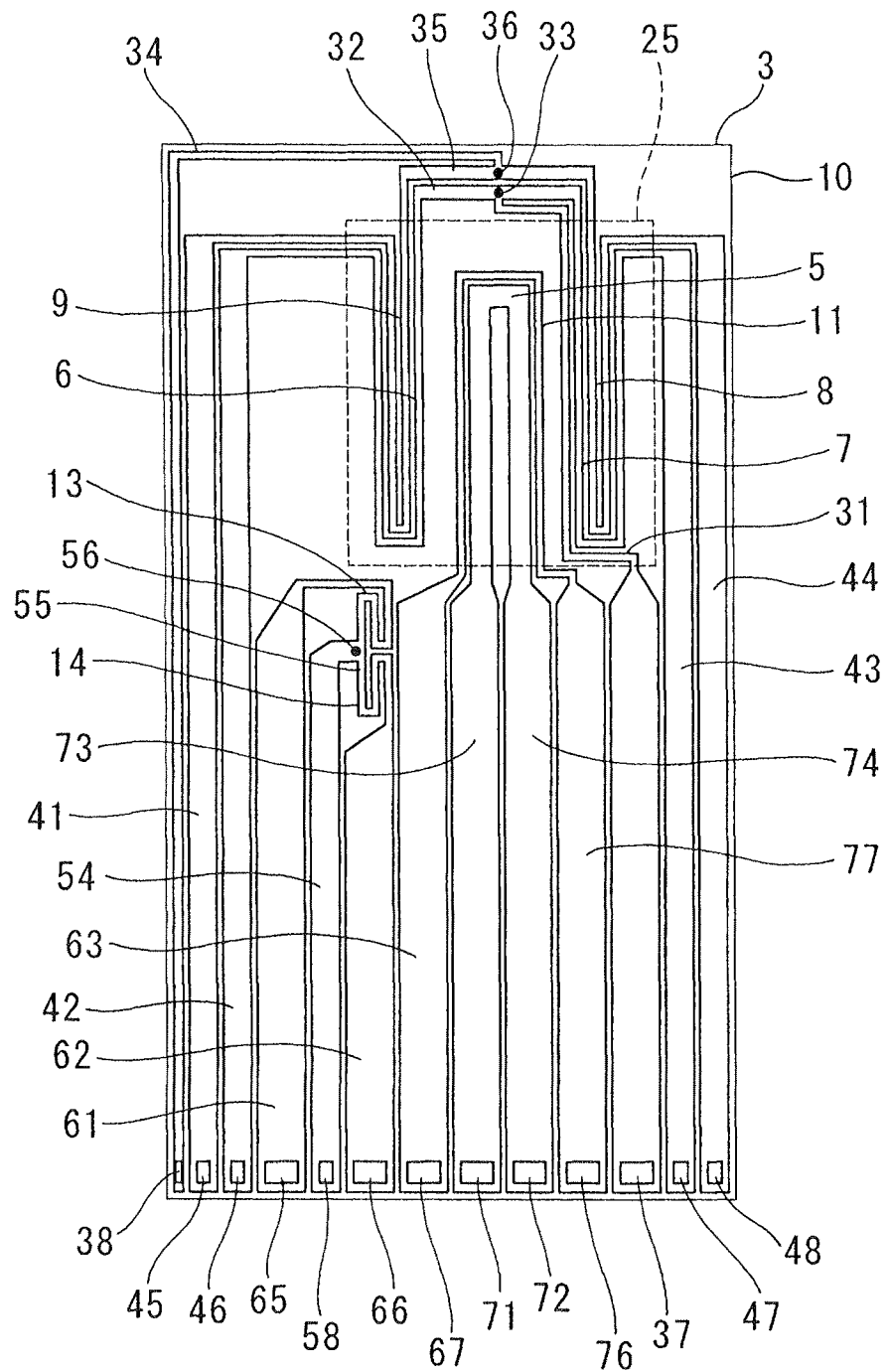
FIG. 8 is a plan view of a sensor chip of an air flow quantity measuring apparatus according to a fifth embodiment of the present invention.
Figure 9:
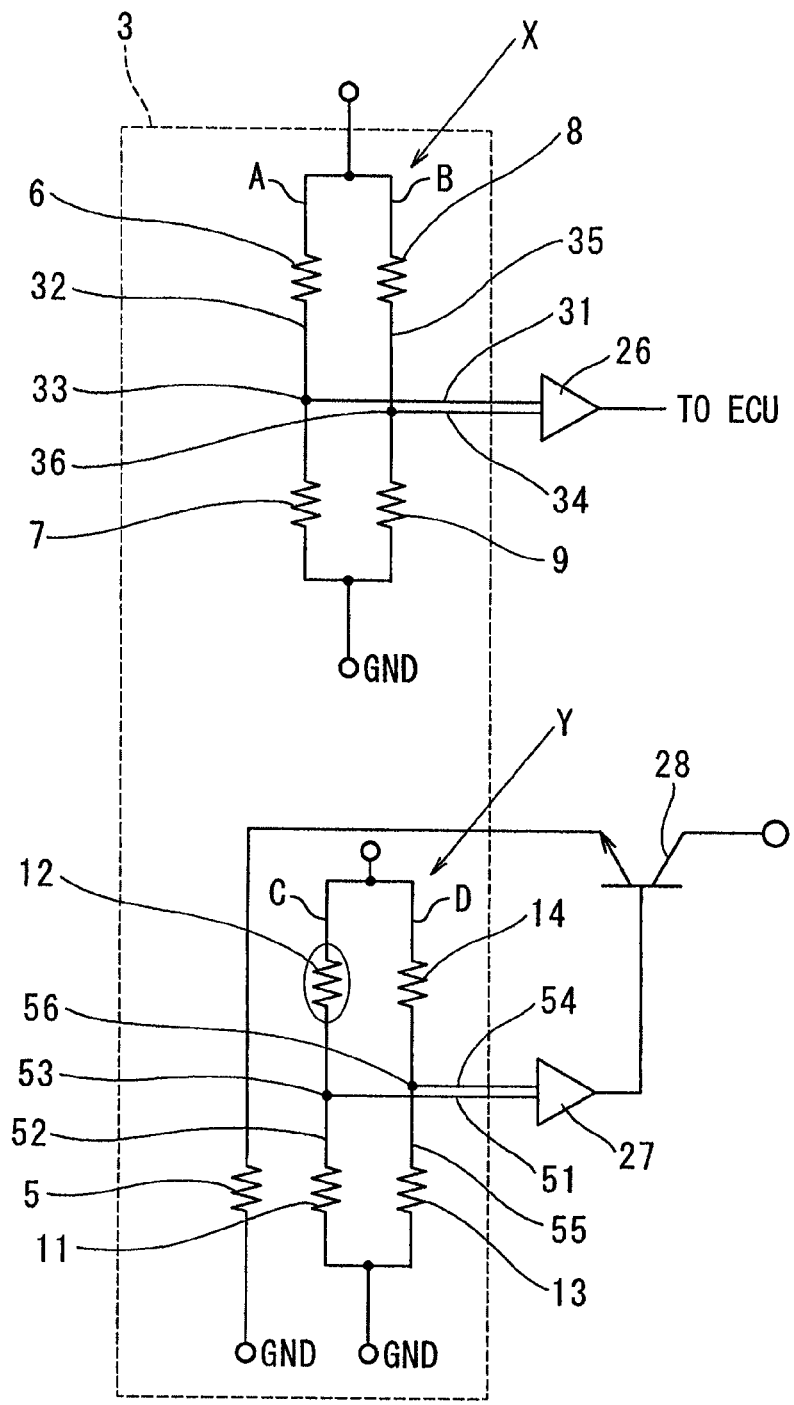
FIG. 9 is a circuit diagram showing a circuit structure of the air flow quantity measuring apparatus of the fifth embodiment.

FIGS. 8 and 9 show a fifth embodiment of the present invention. Specifically, FIG. 8 is a diagram showing a sensor chip of an air flow quantity measuring apparatus of the fifth embodiment, and FIG. 9 is a diagram showing a circuit structure of the air flow quantity measuring apparatus of the fifth embodiment.

Similar to the third and fourth embodiments, the temperature control circuit of the heater resistor 5 of the present embodiment includes the bridge circuit Y, in which the third and fourth series circuits C, D are connected with each other in parallel.

The group of electrode pads of the sensor chip 3, particularly the group of electrode pads, which are used in the temperature control circuit of the heater resistor 5, includes the electrode pad 71, the electrode pad 72 and an electrode pad 76 besides the fourth electrode pad 58 and the electrode pads 65-67.

The electrode pad 76 is electrically connected to the indirectly heated resistor 11 through the resistor conductive line 77. The electrode pad 76 is electrically connected to the fixed resistor 12, which is placed at an outside of the sensor chip 3, through a bonding wire.

Similar to the fourth conductive line 54, the third and fourth connecting conductive lines 52, 55 and the resistor conductive lines 61-63, the electrode pad 76 is formed as a thin film of platinum (Pt), polycrystalline silicon (Poly-Si) or single crystal silicon through the vacuum vapor deposition process or the spattering process.

In the bridge circuit Y, the fixed resistor 12, which is one of the resistors 11, 12 of the third series circuit C, is placed at the outside of the sensor chip 3. In this way, the fixed resistor 12, which is placed at the outside of the sensor chip 3, can be easily replaced with another fixed resistor that has a resistance value, which is different from the resistance value of the fixed resistor 12 of the third and fourth embodiments.

For instance, in the temperature control circuit (system), which controls the heating electric current of the heater resistor 5 such that the temperature of the heater resistor 5 becomes higher than the intake air temperature, which is sensed with the temperature sensor resistor 13, by a predetermined amount (an increased temperature: $+\Delta T$ degrees Celsius), when the fixed resistor 12, which is connected in series to the indirectly heated resistor 11 that receives the heat of the heater resistor 5, is replaced with another fixed resistor that has the resistance value, which is different from the resistance value of the fixed resistor 12 of the third and fourth embodiments, a preset value of temperature increase of the heater resistor 5 can be freely changed.

For example, in a case where the value of the increased temperature of the heater resistor 5 becomes lower than that of the current product (prior art product), the progress of the thermal degradation in the heater resistor 5 and the indirectly heated resistor 11 can be limited, so that the durability of the heater resister 5 and the durability of the indirectly heated resistor 11 can be improved. Furthermore, when the value of the increased temperature of the heater resistor 5 becomes higher than that of the current product (prior art product), a change in the sensed temperature, which is sensed with the four temperature sensor resistors 6-9, is increased even in a case where the air flow quantity of the intake air is very small. Thereby, the flow quantity measurement sensitivity can be improved in the case where the air flow quantity is very small.

Here, it should be noted that the fixed resistor 14 of the fourth series circuit D of the bridge circuit Y may be placed at the outside of the sensor chip 3 instead of the fixed resistor 12 of the third series circuit C of the bridge circuit Y, if desired. Furthermore, both of the fixed resistor 12 and the fixed resistor 14 may be placed at the outside of the sensor chip 3, if desired.

The above embodiments may be modified as follows.

In the above embodiments, the flow quantity measuring apparatus of the present invention is implemented as the flow quantity measuring apparatus, which senses the flow quantity and the flow direction of the intake air supplied to the combustion chamber of the internal combustion engine. Alternatively, the flow quantity measuring apparatus of the present invention may be implemented as a flow quantity measuring apparatus that senses a flow quantity of a gas (e.g., natural gas), which is supplied to a gas appliance, or a flow quantity measuring apparatus that senses a flow quantity of a fluid, such as a gaseous fuel or a liquid fuel, which is supplied to a combustion chamber of a corresponding internal combustion engine.

In the microcomputer of the ECU of the above embodiments, the air flow quantity is computed based on the air flow quantity voltage signal (Vout), which is outputted from the air flow meter, and the computed air flow quantity is used in the various engine control operations (e.g., the fuel injection control operation, the air-to-fuel ratio control operation, the EGR valve opening degree control operation). Here, it should be noted that the air flow quantity voltage signal may be converted into a frequency signal through voltage-to-frequency conversion, and this converted frequency signal may be outputted to the ECU, if desired.

The first or second embodiment may be modified in a manner similar to that of the fifth embodiment. Specifically, at least one of the fixed resistor 12 and the fixed resistor 14 of the first or second embodiment may be placed at the outside of the sensor chip 3. In this way, advantages similar to those of the fifth embodiment can be achieved.

Additional advantages and modifications will readily occur to those skilled in the art. The invention in its broader terms is therefore not limited to the specific details, representative apparatus, and illustrative examples shown and described.

What is claimed is:

1. A flow quantity measuring apparatus comprising:
    a sensor chip that has a circuit board, which includes a thin wall portion, wherein a wall thickness of the thin wall portion, which is measured in a direction perpendicular to a plane of the circuit board, is smaller than that of an adjacent area of the circuit board that is adjacent to the thin wall portion;
    a heat generating resistor that is placed on the thin wall portion, wherein the heat generating resistor generates heat when a heating electric current flows through the heat generating resistor;
    first and second upstream-side temperature sensitive resistors that are placed on the thin wall portion and are located on an upstream side of the heat generating resistor in a flow direction of fluid, wherein a resistance value of each of the first and second upstream-side temperature sensitive resistors is variable depending on a temperature; and
    first and second downstream-side temperature sensitive resistors that are placed on the thin wall portion and are located on a downstream side of the heat generating resistor in the flow direction of the fluid, wherein a resistance value of each of the first and second downstream-side temperature sensitive resistors is variable depending on a temperature, wherein:
    the first upstream-side temperature sensitive resistor and the first downstream-side temperature sensitive resistor are connected with each other in series to form a first series circuit;
    the second downstream-side temperature sensitive resistor and the second upstream-side temperature sensitive resistor are connected with each other in series to form a second series circuit;

the first series circuit and the second series circuit are connected with each other in parallel to form a bridge circuit;

the first upstream-side temperature sensitive resistor and the first downstream-side temperature sensitive resistor have a generally identical characteristic with respect to a change in the resistance value thereof relative to the temperature;

the second downstream-side temperature sensitive resistor and the second upstream-side temperature sensitive resistor have a generally identical characteristic with respect to a change in the resistance value thereof relative to the temperature;

the bridge circuit includes a first conductive line, through which a midpoint electric potential of the first series circuit is outputted, and a second conductive line, through which a midpoint electric potential of the second series circuit is outputted;

the first series circuit includes a first connection, which is located at a midpoint between the first upstream-side temperature sensitive resistor and the first downstream-side temperature sensitive resistor and is connected with the first conductive line;

the second series circuit includes a second connection, which is located at a midpoint between the second downstream-side temperature sensitive resistor and the second upstream-side temperature sensitive resistor and is connected with the second conductive line;

the first connection and the second connection are placed on the sensor chip and are located on a center line of the heat generating resistor, which extends in a direction generally perpendicular to the flow direction of the fluid; and the first conductive line and the second conductive line are branched from the first series circuit and the second series circuit, respectively, on the sensor chip.

2. The flow quantity measuring apparatus according to claim 1, further comprising a temperature sensing resistor that is placed on a corresponding location on the sensor chip, at which the temperature sensing resistor is not substantially influenced by the heat generated from the heat generating resistor, and a resistance value of the temperature sensing resistor is variable depending on an ambient temperature therearound, wherein:

a third resistor is connected to the heat generating resistor in series to form a third series circuit;

a fourth resistor is connected to the temperature sensing resistor in series to form a fourth series circuit;

the bridge circuit is a first bridge circuit; and the third series circuit and the fourth series circuit are connected in parallel to form a second bridge circuit.

3. The flow quantity measuring apparatus according to claim 2, wherein:

the second bridge circuit includes a third conductive line, through which a midpoint electric potential of the third series circuit is outputted, and a fourth conductive line, through which a midpoint electric potential of the fourth series circuit is outputted;

the third series circuit includes a third connection, which is located between the heat generating resistor and the third resistor and is connected with the third conductive line;

the fourth series circuit includes a fourth connection, which is located at a midpoint between the temperature sensing resistor and the fourth resistor and is connected with the fourth conductive line;

one of the third connection and the fourth connection is placed on the sensor chip; and one of the third conductive line and the fourth conductive line, which corresponds to the one of the third connection and the fourth connection, is branched from a corresponding one of the third series circuit and the fourth series circuit on the sensor chip.

4. The flow quantity measuring apparatus according to claim 3, wherein a width of one of the third conductive line and the fourth conductive line is smaller than one of:

a width of a conductive line, which connects one of the heat generating resistor and the third resistor to an external circuit; and a width of a conductive line, which connects one of the temperature sensing resistor and the fourth resistor to the external circuit.

5. The flow quantity measuring apparatus according to claim 2, wherein one of the third resistor and the fourth resistor is placed at an outside of the sensor chip.

6. The flow quantity measuring apparatus according to claim 2, further comprising a control circuit that is placed at an outside of the sensor chip and controls the heating electric current, which flows through the heat generating resistor, such that a difference between a midpoint electric potential of the third series circuit and a midpoint electric potential of the fourth series circuit becomes zero.

7. The flow quantity measuring apparatus according to claim 1, further comprising:

a temperature sensing resistor that is placed on a corresponding location on the sensor chip, at which the temperature sensing resistor is not substantially influenced by the heat generated from the heat generating resistor, and a resistance value of the temperature sensing resistor is variable depending on an ambient temperature therearound; and an indirectly heated resistor that is placed on a corresponding location on the thin wall portion of the sensor chip, at which the indirectly heated resistor is influenced by the heat generated from the heat generating resistor, and a resistance value of the indirectly heated resistor is variable depending on the heat generated from the heat generating resistor, wherein:

a third resistor is connected to the indirectly heated resistor in series to form a third series circuit;

a fourth resistor is connected to the temperature sensing resistor in series to form a fourth series circuit;

the bridge circuit is a first bridge circuit; and the third series circuit and the fourth series circuit are connected in parallel to form a second bridge circuit.

8. The flow quantity measuring apparatus according to claim 7, wherein:

the second bridge circuit includes a third conductive line, through which a midpoint electric potential of the third series circuit is outputted, and a fourth conductive line, through which a midpoint electric potential of the fourth series circuit is outputted;

the third series circuit includes a third connection, which is located between the indirectly heated resistor and the third resistor and is connected with the third conductive line;

the fourth series circuit includes a fourth connection, which is located at a midpoint between the temperature sensing resistor and the fourth resistor and is connected with the fourth conductive line;

one of the third connection and the fourth connection is placed on the sensor chip; and one of the third conductive line and the fourth conductive line, which corresponds to the one of the third connection and the fourth connection, is branched from a corresponding one of the third series circuit and the fourth series circuit on the sensor chip.

9. The flow quantity measuring apparatus according to claim 8, wherein a width of one of the third conductive line and the fourth conductive line is smaller than one of:
- a width of a conductive line, which connects one of the indirectly heated resistor and the third resistor to an external circuit; and
- a width of a conductive line, which connects one of the temperature sensing resistor and the fourth resistor to the external circuit.

10. The flow quantity measuring apparatus according to claim 7, wherein one of the third resistor and the fourth resistor is placed at an outside of the sensor chip.

11. The flow quantity measuring apparatus according to claim 7, further comprising a control circuit that is placed at an outside of the sensor chip and controls the heating electric current, which flows through the heat generating resistor, such that a difference between a midpoint electric potential of the third series circuit and a midpoint electric potential of the fourth series circuit becomes zero.

12. The flow quantity measuring apparatus according to claim 1, further comprising a sensing circuit that is placed at an outside of the sensor chip and outputs a flow quantity voltage signal based on a difference between a midpoint electric potential of the first series circuit and a midpoint electric potential of the second series circuit.

13. The flow quantity measuring apparatus according to claim 1, wherein a width of one of the first conductive line and the second conductive line is smaller than one of:
- a width of a conductive line, which connects one of the first upstream-side temperature sensitive resistor and the first downstream-side temperature sensitive resistor to an external circuit; and
- a width of a conductive line, which connects one of the second downstream-side temperature sensitive resistor and the second upstream-side temperature sensitive resistor to the external circuit.

\* \* \* \* \*